US012391368B2

(12) United States Patent
Mackin

(10) Patent No.: US 12,391,368 B2
(45) Date of Patent: Aug. 19, 2025

(54) DRAG MODIFICATION SYSTEMS FOR AIRCRAFT AND RELATED METHODS

(71) Applicant: The Boeing Company, Chicago, IL (US)

(72) Inventor: Steve G. Mackin, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/741,317

(22) Filed: May 10, 2022

(65) Prior Publication Data

US 2022/0363370 A1    Nov. 17, 2022

Related U.S. Application Data

(60) Provisional application No. 63/187,182, filed on May 11, 2021.

(51) Int. Cl.
*B64C 21/02*    (2006.01)
*B64C 21/06*    (2023.01)

(52) U.S. Cl.
CPC ............ *B64C 21/025* (2013.01); *B64C 21/06* (2013.01)

(58) Field of Classification Search
CPC ....... B64C 21/025; B64C 21/08; B64C 21/02; B64D 2013/0622
See application file for complete search history.

(56) References Cited

U.S. PATENT DOCUMENTS

| | | | | | |
|---|---|---|---|---|---|
| 3,752,422 | A | * | 8/1973 | Runnels | B64D 13/00 244/53 B |
| 4,000,869 | A | * | 1/1977 | Wong | B64D 33/02 137/15.1 |
| 4,666,104 | A | * | 5/1987 | Kelber | B64C 21/06 244/209 |
| 5,899,416 | A | * | 5/1999 | Meister | B64C 21/06 244/87 |
| 10,252,811 | B2 | * | 4/2019 | Bell | F02C 7/05 |
| 2003/0080244 | A1 | * | 5/2003 | Dionne | B64D 33/08 244/57 |
| 2007/0246607 | A1 | * | 10/2007 | Sheoran | B64D 41/00 244/129.4 |
| 2016/0376009 | A1 | * | 12/2016 | Ellsworth | B64D 13/06 60/785 |

* cited by examiner

*Primary Examiner* — Richard Green
*Assistant Examiner* — Nevena Aleksic
(74) *Attorney, Agent, or Firm* — Hanley, Flight & Zimmerman, LLC

(57) ABSTRACT

Drag modification systems for aircraft and related methods. An example system for modifying drag on an aircraft includes a boundary layer intake plenum and an eductor. The eductor defines a primary inlet to receive a primary fluid, a secondary inlet in fluid communication with the intake plenum to receive a secondary fluid entrained from the intake plenum, and an outlet to exhaust a mixed flow including the primary fluid and the secondary fluid. The primary fluid is a motive fluid having flow parameters to generate a suction at the secondary inlet.

21 Claims, 16 Drawing Sheets

DRAG MODIFICATION SYSTEMS FOR AIRCRAFT AND RELATED METHODS

RELATED APPLICATIONS

This patent claims the benefit of U.S. Provisional Patent Application Ser. No. 63/187,182 entitled "DRAG MODIFICATION SYSTEMS FOR AIRCRAFT AND RELATED METHODS", which was filed on May 11, 2021. Priority to U.S. Provisional Patent Application No. 63/187,182 is hereby claimed.

FIELD OF THE DISCLOSURE

This disclosure relates generally to aerodynamics of an aircraft and, more particularly, to drag modification systems for aircraft and related methods.

BACKGROUND

Air traveling over the fuselage of an aircraft creates a boundary layer along the fuselage (e.g., along an aft and/or rear portion of the fuselage) where the velocity of the air reduces below the free stream velocity. The velocity deficit of the boundary layer relative to the free stream generates a drag force on the fuselage and/or, more generally, on the aircraft. At present, drag resulting from the aforementioned fuselage boundary layer is accepted as part of the overall drag associated with operating the aircraft. However, as drag increases, the amount of fuel consumed also increases. Thus, there is a persistent interest in the aircraft industry with regard to developing and implementing technologies designed to reduce drag, including reducing drag attributed to the existence of the fuselage boundary layer.

SUMMARY

An example system for modifying drag on an aircraft includes a boundary layer intake plenum and an eductor. The eductor defines a primary inlet to receive a primary fluid, a secondary inlet in fluid communication with the intake plenum to receive a secondary fluid entrained from the intake plenum, and an outlet to exhaust a mixed flow including the primary fluid and the secondary fluid. The primary fluid is a motive fluid having flow parameters to generate a suction (e.g., a negative pressure) at the secondary inlet.

Another example system to modify drag of an aircraft includes a manifold defining a passageway to extend from an exterior of a fuselage of the aircraft to an exhaust of the aircraft. The passageway includes a first inlet in fluid communication with a motive fluid, a second inlet in fluid communication with the exterior of the fuselage, and an outlet in fluid communication with the exhaust. The motive fluid is to generate a suction to cause airflow to draw through the second inlet and channel the airflow to the exhaust to reduce drag.

An example method to reduce drag of an aircraft includes providing a high energy airflow into an eductor; entraining air from an intake plenum into the high energy airflow via the eductor; receiving a boundary layer airflow into the intake plenum as a result of a negative pressure gradient effectuated by entrainment of air from the intake plenum into the eductor; and discharging the high energy airflow and the boundary layer airflow from the eductor.

An example method to increase drag of an aircraft includes providing a high energy airflow into an eductor; blocking an exit of the eductor such that the high energy airflow flows into an intake plenum; and discharging the high energy airflow into a boundary layer from the intake plenum as a result of a positive pressure gradient from the intake plenum into the ambient air.

Figure 1:
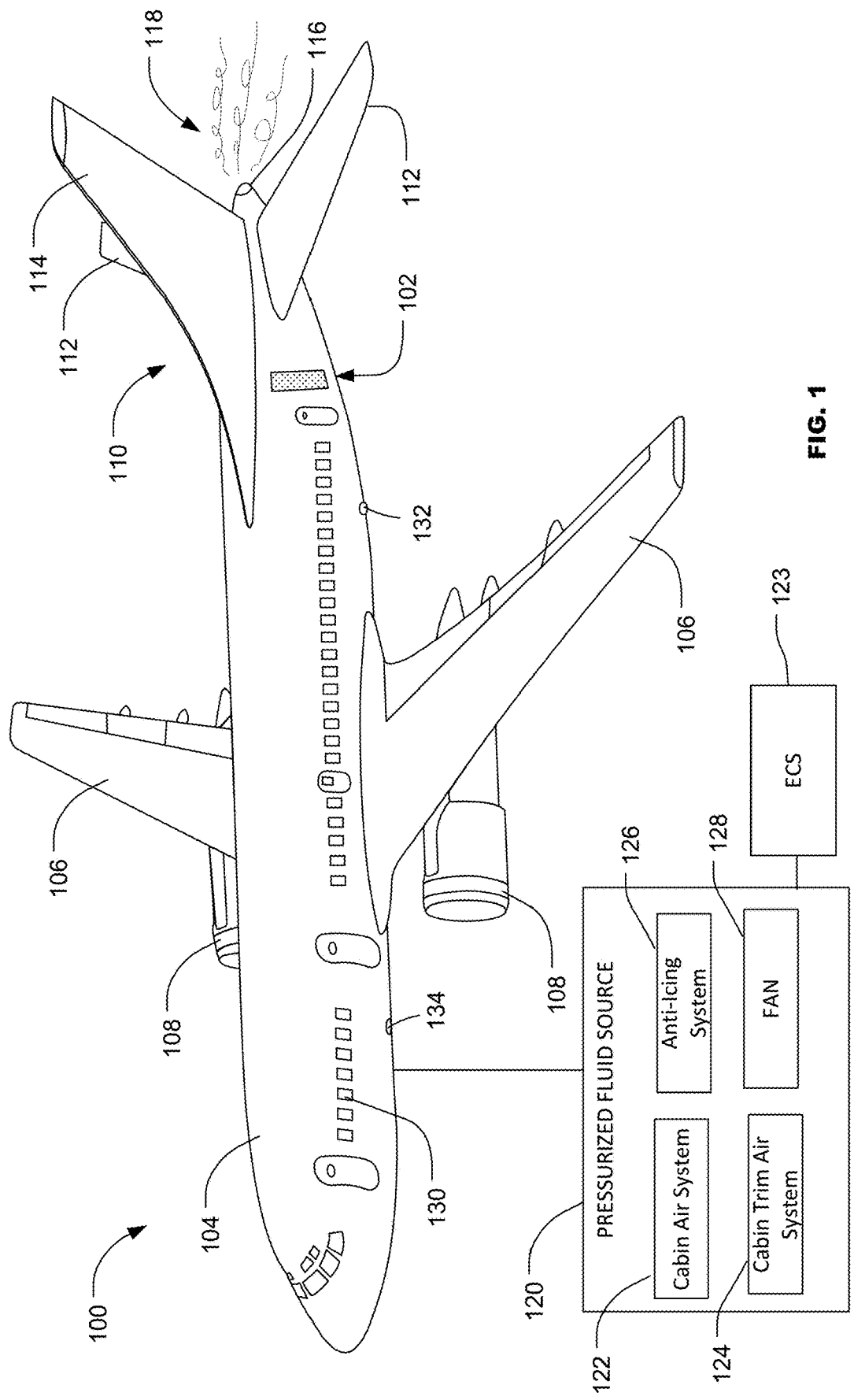
FIG. 1 is a perspective view of an example aircraft having an example drag modification system constructed in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Boundary layer airflow can build up and spill into a wake of an aircraft during flight, thereby increasing drag and reducing aircraft efficiency. Drag resulting from the existence of a fuselage boundary layer is generally accepted as part of the overall drag associated with operating an aircraft. However, as drag increases, the amount of fuel consumed also increases.

To accelerate an aircraft fuselage boundary layer, some known aircraft employ boundary layer ingestion techniques. Boundary layer ingestion (BLI) is an area of aerodynamic research that focuses on reducing drag by ingesting (e.g., via a propeller) the fuselage boundary layer, and to accelerate the associated airflow of the ingested fuselage boundary layer to a velocity that equals or exceeds the free stream velocity. A common characteristic among known BLI solutions is the requirement that one or more large, heavy, thrust-producing engine(s) be installed at the rear of the fuselage (e.g., proximate a tail of the aircraft), with the propeller of each such engine being configured to ingest the fuselage boundary layer and accelerate the associated airflow of the ingested fuselage boundary layer to a velocity that equals or exceeds the free stream velocity. Such known BLI solutions are typically not retrofittable to existing aircraft designs absent significant structural modifications to the aircraft. Furthermore, while such known BLI solutions conceptually generate the aforementioned drag-reduction benefit associated with the fuselage boundary layer, the bulk (e.g., the size and/or weight) of the large, heavy, thrust-producing engine(s) required by such known BLI solutions introduces system penalties on the aircraft that undermine the drag-reduction benefit associated with the fuselage boundary layer.

In some examples, boundary layer systems employ a suction system to draw air from a porous fuselage skin using one or more fluid energizing sources, such as turbomachines, compressors, etc. For example, a suction system includes a plenum having a system of ducts that suck air from an exterior of the fuselage via one or more compressors or pumps. However, the suction systems employing compressors or other turbomachinery are complex, add significant weight, and/or require additional energy to operate the pumps, thereby reducing aircraft efficiency.

Example apparatus, systems and methods disclosed herein modify drag of an aircraft. For example, the apparatus, systems and/or methods disclosed herein can decrease drag during one or more phases of flight when such reduction of drag is beneficial to improve efficiency characteristics during flight in some examples, example systems and apparatus disclosed herein can increase drag during one or more other phases of flight when such increase of drag is beneficial to flight performance. The methods and apparatus disclosed herein can modify drag without the use of external and/or additional fans, compressors, turbomachines and/or the like.

For example, unlike the known BLI solutions described above, which require the installation of one or more large, heavy, thrust-producing engine(s) at the rear of the fuselage of the aircraft, the methods and apparatus disclosed herein modify drag due to fuselage boundary layer via a suction (e.g., a vacuum) generated at an exterior of the fuselage without the use of additional fans, compressors, turbomachines, etc. In some examples, the methods and apparatus disclosed herein ingest and accelerate an aircraft fuselage boundary layer to improve the boundary layer profile, which results in a reduction of drag. The disclosed methods and apparatus advantageously implement a manifold and a fluid mixer (e.g., an eductor or ejector) having a size and/or a weight that is substantially less than the bulk of the large, heavy, thrust-producing engine(s) required by known BLI solutions.

To create suction and ingest the boundary layer, the example manifold apparatus disclosed herein employs a high energy fluid (e.g., a motive fluid). A mass flow rate of the high energy fluid is increased via a fluid mixer, eductor, ejector and/or other fluid mixer. In other words, the motive fluid provides a suction or vacuum via the manifold and the fluid mixer to entrain air from the boundary layer of the fuselage into the high energy airflow via the eductor. Specifically, the fluid mixer receives a boundary layer airflow as a result of a negative pressure gradient effectuated by entrainment of air from the plenum into the eductor.

For example, to provide the motive fluid, example methods and apparatus disclosed herein advantageously leverage pressurized airflow from existing air supply systems of an aircraft. For example, the methods and apparatus disclosed herein advantageously leverage the pressure and/or velocity of cabin air supply and/or cabin trim air to provide a high energy or motive fluid for siphoning off the boundary layer (e.g., boundary layer bleed suction) and reducing aircraft drag. Although example methods and apparatus disclosed herein employ pressurized air from a cabin air supply source and/or a cabin trim air supply source, the example methods and apparatus disclosed herein can be configured or structured to receive or bleed air from an aircraft engine, air supply from shaft driven compressors, fan air, and/or any other pressurized air from any other pressurized fluid supply source of an aircraft. For example, during cruise, cabin air can be employed as a high energy or motive fluid to flow through a fluid mixer (e.g., an eductor, an ejector, etc.) to create suction necessary for a boundary layer removal system to reduce aircraft drag on an aircraft fuselage. Additionally, example methods and apparatus disclosed herein can advantageously discharge or exhaust the mixed airflow overboard in a low momentum flow region (e.g., wake of an aircraft), which reduces drag and/or improves (e.g., increases) thrust recovery.

In some examples, apparatus, systems and methods disclosed herein can increase drag during a flight phase when increasing drag is beneficial. For example, during decent, increased drag can reduce the distance needed to descend the aircraft, which can increase and/or improve aircraft efficiency. In some examples, apparatus, systems and methods disclosed herein provide the dual function of reducing drag and increasing drag during different phases of flight For example, to increase drag, a high energy airflow is provided into the fluid mixer (e.g., an eductor). An outlet of the fluid mixer is blocked such that the high energy airflow flows into a fuselage intake plenum and discharges into a boundary layer from the fuselage plenum into the ambient air.

In some examples, the disclosed methods and apparatus for ingesting and accelerating an aircraft fuselage boundary layer utilize structural components that are retrofittable with, and/or easily incorporated into, one or more existing aircraft design(s). In such examples, the disclosed methods and apparatus can advantageously be implemented on an existing aircraft and/or incorporated into an existing aircraft design without making significant structural modifications to the aircraft.

Although example methods and apparatus disclosed herein employ pressurized air from a cabin air supply source and/or a cabin trim air supply source, and/or any other pressurized fluid sources of an aircraft, the example methods and apparatus disclosed herein can be configured or structured to operate independently from an environmental control system of an aircraft that regulates cabin airflow, a control system for regulating cabin trim air, and/or any other system from which example methods and apparatus disclosed herein receive pressurized fluid.

FIG. 1 is a perspective view of an example aircraft 100 having an example drag modification system 102 constructed in accordance with teachings of this disclosure. The example aircraft 100 of FIG. 1 is a commercial airliner (e.g., a jumbo jet). However, in other examples, the drag modification system 102 disclosed herein can be implemented with other aircraft. The aircraft 100 of FIG. 1 includes a fuselage 104, wings 106 to support respective engines 108, and an empennage 110 (e.g., a tail or rear section) having example horizontal stabilizers 112 and an example vertical stabilizer 114 respectively coupled to and projecting outward from the fuselage 104. The aircraft 100 of FIG. 1 includes an auxiliary power unit (APU) exhaust 116 that exhausts into a wake region 118 of the aircraft 100 during flight.

As shown in FIG. 1, the drag modification system 102 is located adjacent and/or supported by the fuselage 104 at a position that is rearward (e.g., aft) of the wings 106. In other examples, the position at which the drag modification system 102 is located can be along any other portion of the fuselage 104 (e.g., fore of the wings 106, at a midsection of the fuselage 104, etc.). As described in greater detail below, the drag modification system 102 of the illustrated example reduces a boundary layer airflow without use of external and/or additional compressors, fans, pumps, and/or other turbomachinery. Instead, the drag modification system 102 employs a motive fluid to suction off a boundary layer airflow from the fuselage 104 (e.g., an external surface) of the aircraft 100 during flight. Specifically, the drag modification system 102 of the illustrated example leverages pressurized air from existing pressurized air sources of the aircraft 100. In some examples, the drag modification system 102 can employ pressurized fluid from a pressurized fluid source 120 including, but not limited to for example, an cabin air system 122 (e.g., pressurized bleed flow conditioned by an environmental control system 123), a cabin trim air system 124, an anti-icing system 126 (e.g., an engine anti-icing system (EAI) and/or wing anti-icing system (WAI)), a fan 128 (e.g., an electric fan, fan air, etc.) and/or any other pressurized fluid source of the aircraft 100.

For example, to provide airflow and/or pressurization for a cabin 130 of the fuselage 104 during flight (e.g., taxiing, take-off, climb, cruise, descent, landing), the aircraft 100 of the illustrated example employs the cabin air system 122. The cabin air system 122 can receive pressurized air from, for example, an electric air compressor, bleed air from a turbo-compressor, bleed air provided from one or more compressor stages of the turbine engines 108, a cabin trim air from the cabin trim air system 124, an air conditioning pack of the environmental control system 123, and/or any other air source for supporting the environmental control system 123 of the aircraft 100. For example, bleed air from the turbine engines 108 can be provided at a pressure sufficient to pressurize air to the cabin 130. In addition, bleed air pressure is sufficient to operate one or more air conditioning packs of the cabin air system 122 and/or the environmental control system 123 to control a temperature of the cabin air. To exhaust or vent the cabin air from the cabin 130, the aircraft 100 of FIG. 1 can include a plurality of outflow values, such as a primary outflow valve 132 and/or a secondary outflow valve 134. Thus, the environmental control system 123 controls or modulates the primary outflow valve 132 and/or the secondary outflow valve 134 automatically to regulate airflow and/or pressure in the cabin 130 to maintain a desired cabin pressure.

For example, during flight, atmospheric pressure decreases as altitude increases. The environmental control system 123 controls and/or maintains air pressure inside the cabin 130 based on a flight altitude of the aircraft 100. For example, the environmental control system 123 determines, obtains or otherwise uses a cabin pressure altitude schedule to set or maintain cabin air pressure at a required or desired pressure (e.g., between about 14.6 psia and 11 pounds per square inch absolute (psia) during cruise, such as 14.6 psia, 12.2 psia, or 11 psia) corresponding to a specific flight altitude of the aircraft 100. In some examples, the environmental control system 123 may operate or control (e.g., modulate) the primary outflow valve 132 and/or the secondary outflow valve 134 in accordance with a predetermined schedule or as a function of one or more operational criteria. For example, the environmental control system 123 may include a controller (e.g., a processor) that receives data and/or signals from sensors representative of current flight conditions including, for example, aircraft airspeed, altitude, a number of passengers in the cabin 130, air temperature, atmospheric pressure, cabin pressure, angle of attack, and/or other parameter(s). Based on this pressure differential, the environmental control system 123 controls the operation of the primary outflow valve 132 and/or the secondary outflow valve 134 to control or modulate the rate (i.e., mass flow rate) at which pressurized air is transferred between the cabin 130 and the atmosphere to control the air pressure within the cabin 130 of the aircraft 100 based on a predetermined pressure differential schedule or criterion.

To heat cabin air, the example aircraft 100 of FIG. 1 employs the cabin trim air system 124. The cabin trim air system 124 provides pressurized, heated air that bypasses air conditioning units of the cabin air system 122 and/or the environmental control system 123 to heat cabin air to a desired temperature (e.g., between 60 and 70 degrees Fahrenheit) at various or different zones of the cabin 130. Trim air is hot bleed air that bypasses air conditioning packs of the environmental control system. Small amounts of trim air are mixed with air supplied to the cabin from a mixing manifold to provide independent fine temperature control in different zones of the cabin. The anti-icing system 126 employs pressurized and/or heated fluid (e.g., bleed air, air from a shaft driven compressor, etc.) that can be used to de-ice (e.g., heat) portions of the turbine engines 108 (e.g., inlet cowls of the turbine engines 108) and/or the wings 106 of the aircraft 100.

The drag modification system 102 disclosed herein employs pressurized fluid as a high energy or motive fluid to suction off and/or ingest boundary layer airflow during flight (e.g., from the cabin air system 122, cabin trim air from the cabin trim air system 124, pressurized air from the anti-icing system 126, the fan 128, and/or any other pressurized source). Although the drag modification system 102 of FIG. 1 receives pressurized fluid from the pressure fluid source 120, the drag modification system 102 operates independently of the other systems of the aircraft 100 from which it receives the pressurized fluid. For example, although the drag modification system 102 of the illustrated example consumes pressurized fluid from an existing pressurized fluid source 120 of the aircraft 100, the drag modification system 102 does not affect (e.g., decrease) an efficiency and/or operation of the systems from which the drag modification system 102 receives the pressurized fluid. Thus, the drag modification system 102 does not affect operation of the cabin air system 122, the environmental control system 123, the cabin trim air system 124, the anti-icing system 126, and/or any other pressurized fluid source 120 from which the drag modification system 102 leverages the pressurized fluid. In some examples, the drag modification system 102 can receive cabin air that would otherwise be dumped overboard via the primary outflow valve 132 and/or the secondary outflow valve 134. Thus, the drag modification system 102 can be used to dump the cabin air from the cabin 130.

Figure 2A:
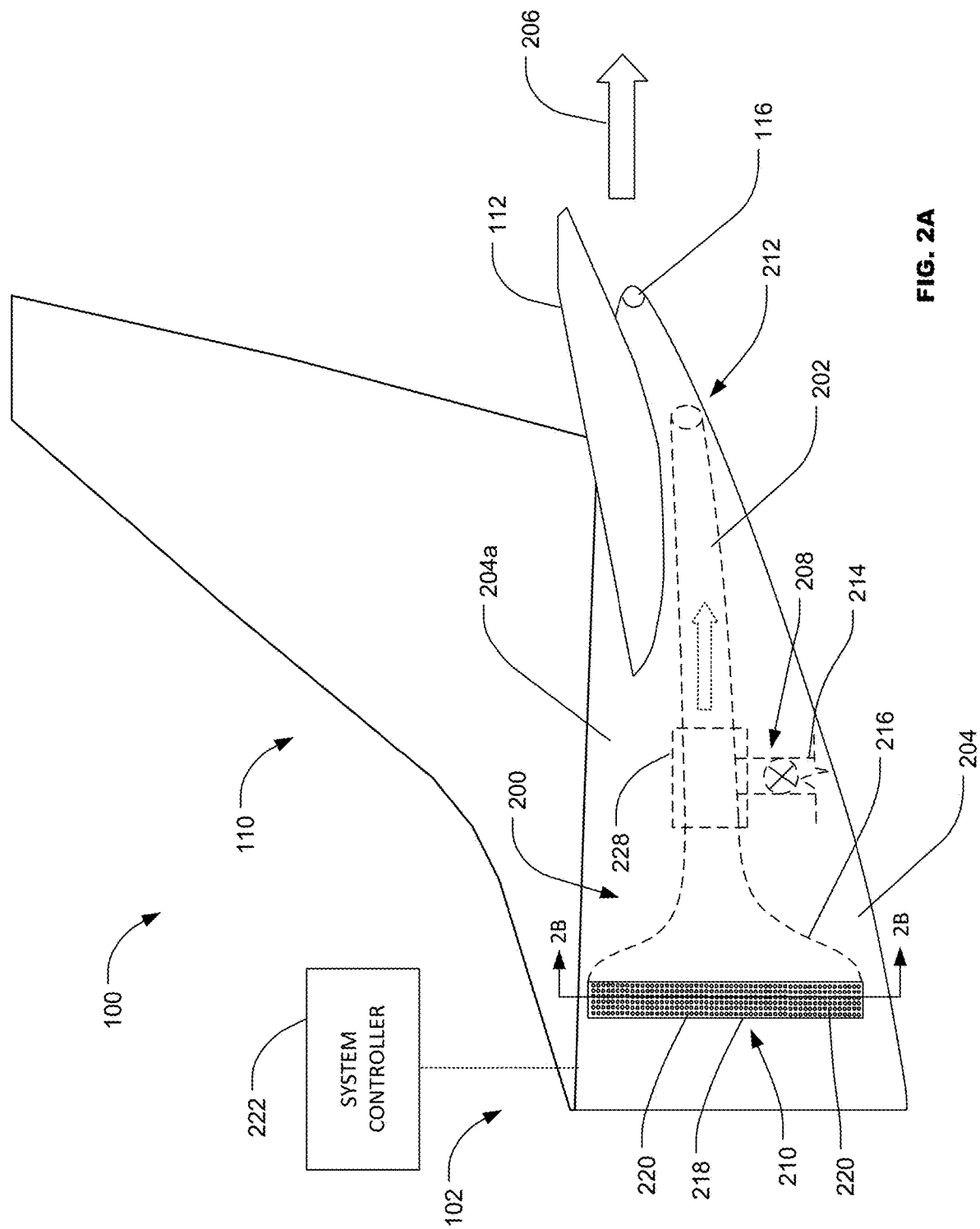
FIG. 2A is a partial, side view of the example aircraft of FIG. 1.
Figure 2B:
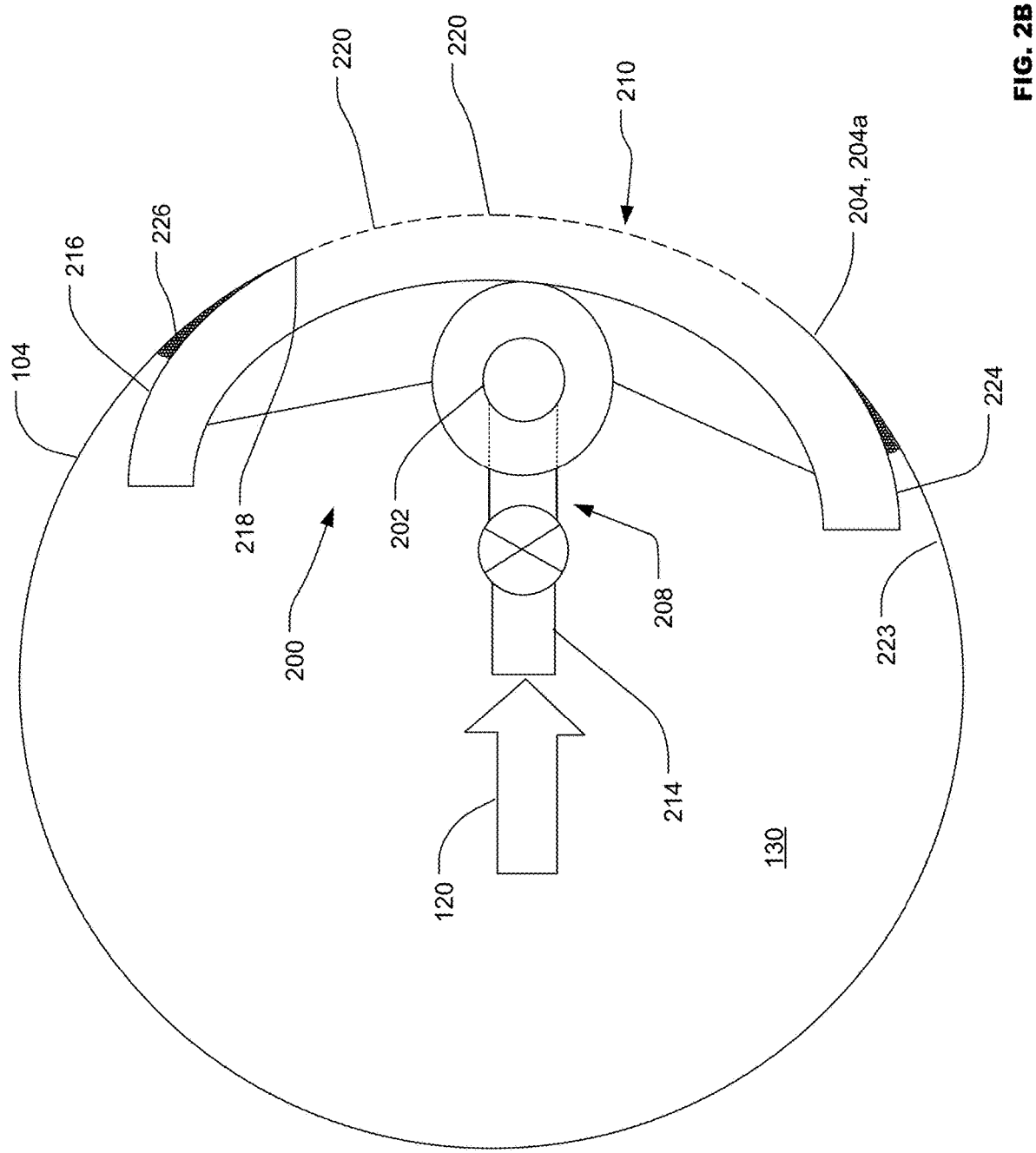
FIG. 2B is a side cross-sectional view of a partial portion of the example aircraft taken along line 2B-2B of FIG. 2A.

FIG. 2A is a partial side view of the aircraft 100 of FIG. 1. FIG. 2B is a cross-sectional view of the aircraft 100 taken along line 2B-2B of FIG. 2A Referring to FIGS. 2A and 2B, the drag modification system 102 of the illustrated example includes a manifold 200 defining a passageway 202 extending between an external and/or exterior surface 204 (e.g., a fuselage skin 204*a*) of the fuselage 104 of the aircraft 100 and an exhaust 206 of the aircraft 100 when the manifold 200 is coupled to the aircraft 100. Specifically, the passageway 202 of the illustrated example includes a first inlet 208 (e.g., a primary inlet), a second inlet 210 (e.g., a secondary inlet), and an outlet 212. The passageway 202 of the illustrated example channels fluid flow from the first inlet 208 and the second inlet 210 to the outlet 212. The passageway 202 of the illustrated example can be formed using tubes, hoses, ducts, pipes, and/or other fluid flow channels or passageways and extends between the first inlet 208, the second inlet 210 and the outlet 212.

The first inlet 208 of the illustrated example receives pressurized fluid from the aircraft 100. For example, the first inlet 208 receives pressurized fluid or a motive fluid from the pressurized fluid source 120 of FIG. 1. In the illustrated example, the first inlet 208 receives pressurized fluid from the cabin air system 122 (FIG. 1). To receive the pressurized fluid flow, the first inlet 208 is fluidly coupled to the pressurized fluid source 120 via a flow path 214. For example, the flow path 214 can be tubing, piping, a hose, a duct and/or any other passageway for fluidly coupling the first inlet 208 and the pressurized fluid source 120. The pressurized fluid received by the first inlet 208 has a pressure or energy that is greater than the ambient pressure of air external to the fuselage 104. For example, the pressurized fluid at the first inlet 208 can have a pressure range of between approximately 14.6 psia and 11 psia, such as about 14.6 psia, about 12.2 psia, or about 11 psia.

The second inlet 210 receives and/or suctions off boundary layer airflow during flight. To receive the boundary layer airflow, the second inlet 210 of the drag modification system 102 of FIG. 2 is in fluid communication with the external and/or exterior surface 204 (e.g., a fuselage skin 204*a*) of the fuselage 104. The second inlet 210 is positioned downstream from the wings 106 (FIG. 1) of the aircraft 100 and upstream from the empennage 110 (e.g., the horizontal stabilizers 112) of the aircraft 100. In the illustrated example, the second inlet 210 includes an inlet plenum 216 (e.g., an inlet manifold). The intake plenum 216 of FIG. 2 has an intake frame 218 that is mounted to the exterior surface 204 of the fuselage 104. Specifically, referring to FIG. 2B, the second inlet 210 (e.g., the intake frame 218) is flush mounted relative to the fuselage skin 204*a*. For example, the inlet frame 218 has a shape and/or contour that maintains a flush orientation relative to the fuselage skin 204*a* along a perimeter (e.g., an entire perimeter) of the intake frame 218. For example, the intake frame 218 of the illustrated example has a rectangular shape and has a curvature (e.g., a radius of curvature) complementary to a curvature (e.g., a radius of curvature) of the fuselage skin 204*a* to enable the intake frame 218 to flush mount relative to the fuselage skin 204*a*. To allow intake of boundary layer airflow via the second inlet 210, the intake plenum 216 (e.g., the intake frame 218) includes a plurality of openings 220. The openings 220 of the intake plenum 216 have a relatively small diameter to prevent debris and/or other foreign objects from entering in the second inlet 210 and/or the passageway 202. In some examples, the intake frame 218 having the openings 220 is a perforated plate and/or skin. In some embodiments the openings 220 and/or perforations in the plate can be microperforations. In some examples, a size of each one of the openings 220 can be between approximately 0.02 millimeters and 1.5 millimeters. The intake frame 218 can be composed of titanium, aluminum and/or any other suitable material. In some examples, second inlet 210 and/or the intake frame 218 can include slits, holes, perforations (shaped holes), louvers, a screen, and/or any other frame having openings to allow intake of boundary layer airflow during flight. To seal between an internal surface 223 (e.g., the cabin 130) of the fuselage 104 and the intake plenum 216 (e.g., an exterior surface 224 (FIG. 2B), the drag modification system 102 includes a seal 226. The seal 226 can be provided around a perimeter of the intake frame 218 to prevent airflow from flowing within the cabin 130 of the aircraft 100 between the intake frame 218 and the fuselage skin 204*a*. The seal 226 can be a rubber gasket, foam, and/or any other seal. Thus, airflow is permitted only through the openings 220 of the drag modification system 102.

The passageway 202 of the example drag modification system 102 is structured to generate suction at the second inlet 210 when the passageway 202 receives pressurized fluid via the first inlet 208. To generate suction at the second inlet 210, the drag modification system 102 of the illustrated example includes a fluid mixer 228. In some examples, the fluid mixer 228 can be, but is not limited to, a mixing manifold, an eductor, an ejector, a nozzle, a flow mixer, a venturi device or manifold, and/or any other structure for mixing flow to generate suction at the second inlet 210 by utilizing pressurized fluid from the pressurized fluid source 120 (FIG. 1) as a motive fluid. In other words, the passageway 202 and/or the fluid mixer 228 generates a negative pressure gradient proximate to (e.g., across) the second inlet 210 when the pressurized fluid 208 is provided at the first inlet 208 and discharges to the outlet 212. The outlet 212 exhausts mixed airflow (e.g., the mixed motive fluid and the suctioned fluid) from the aircraft 100.

To control, manage, regulate, and/or adjust one or more aspects(s) of an operation of the drag modification system 102, the drag modification system 102 of the illustrated example employs a system controller 222. For example, the system controller 222 can be integrated and/or otherwise incorporated into the aircraft 100. For example, the system controller 222 can be communicatively coupled with a main controller (e.g., Flight Management System (FMS), Full Authority Digital Engine Control (FADEC), or Environmental Control Systems Controller (ECSC)) of the aircraft 100.

The outlet 212 of the illustrated example is in fluid communication with the APU exhaust 116 and airflow from the drag modification system 102 expels in the exhaust 206 of the aircraft 100. Specifically, the mixed airflow exhausts in the wake region 118 of the aircraft 100 during flight, which decreases drag and increases thrust recovery efficiency. In the illustrated example, the outlet 212 is positioned below the APU exhaust 116.

Additionally, the outlet 212 of the illustrated example is positioned upstream from the APU exhaust 116. The outlet 212 is not limited to the configuration shown in FIG. 2A For example, the outlet 212 can be positioned at any desirable location. Various configurations are shown in FIGS. 2C-2E.

Figure 2C:
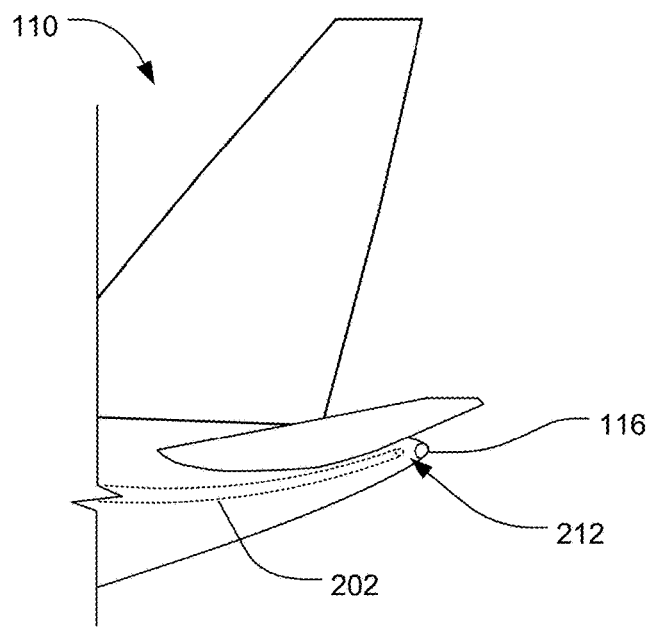
FIGS. 2C-2E are partial views of an example empennage of an aircraft illustrating different configurations of example outlets of example drag modification systems disclosed herein.
Figure 2D:
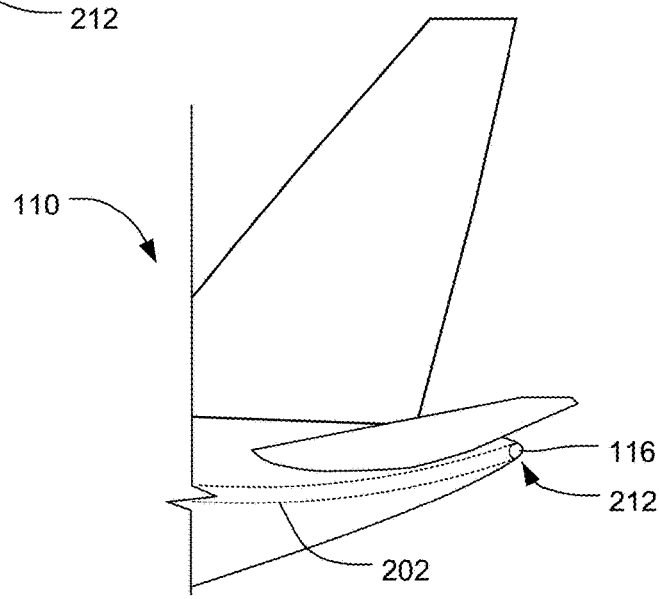
Figure 2E:
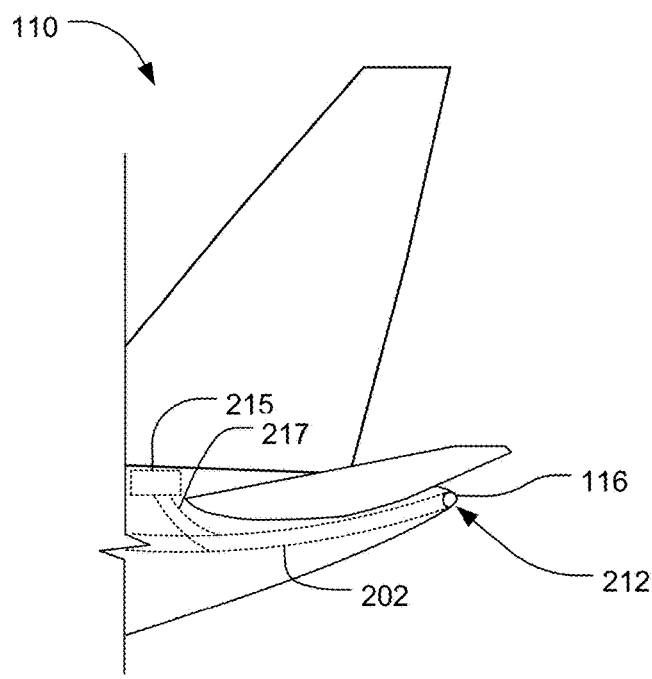

FIGS. 2C-2E are partial views of the empennage 110 of the aircraft 100 illustrating different configurations of the outlet 212 of the drag modification system 102 disclosed herein. Referring to FIG. 2C, the outlet 212 of the passageway 202 at positioned proximate to the APU exhaust 116. Referring to FIG. 2D, the outlet 212 of the passageway 202 is concentric and/or symmetrical with the APU exhaust 116. Referring to FIG. 2E, the outlet 212 of the passageway 202 is coupled with an exhaust passageway 215 of an auxiliary power unit 217 of the aircraft 100. For example, the passageway 202 receives the exhaust passageway 215 of the auxiliary power unit 217 upstream from the outlet 212 and/or the APU exhaust 116. In some examples, the outlet 212 can be coupled to the exhaust passageway 215, and the exhaust passageway 215 can fluidly couple the outlet 212 of the passageway 202 and the APU exhaust 116. Thus, the outlet 212 of the drag modification systems disclosed herein can be structured and/or fluidly coupled to various components and/or outlets of the aircraft 100.

Figure 3:
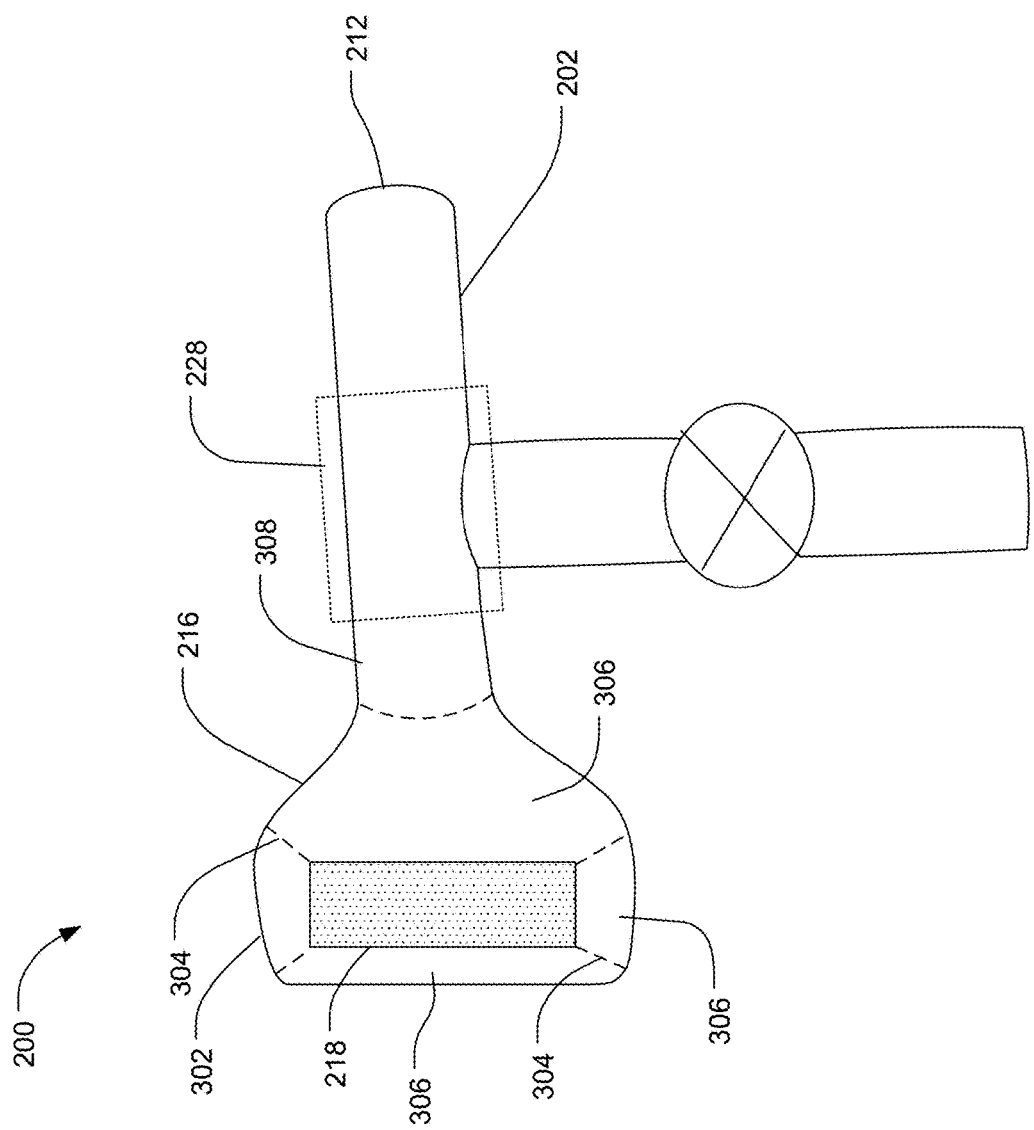
FIG. 3 is a perspective view of the example drag modification system of FIGS. 1, 2A and 2B.

FIG. 3 is a perspective view of the example drag modification system 102 of FIGS. 1, 2A and 2B. The manifold 200 of the illustrated example includes a head 302. The head 302 of the illustrated example is an enclosed structure that defines a cavity of the intake plenum 216. For example, the head 302 includes frame members 304 to define a shape of the head 302 and panels 306 that couple to the frame members 304 to enclose the head 302. The frame members 304 form an opening to receive the intake frame 218, which provides an opening for the head 302. The head 302 attaches to the internal surface 223 (FIG. 2B) of the fuselage 104. For example, the head 302 attaches to a frame of the fuselage 104, a stringer, a longeron, a bulkhead, and/or any other structure of the fuselage 104. The head 302 can be formed of sheet metal, stainless steel, aluminum, rubber, and/or any other material(s). The head 302 includes an end 308 that is structured or forms a tube to configure the head 302 for attachment to a pipe defining the outlet 212.

Figure 4:
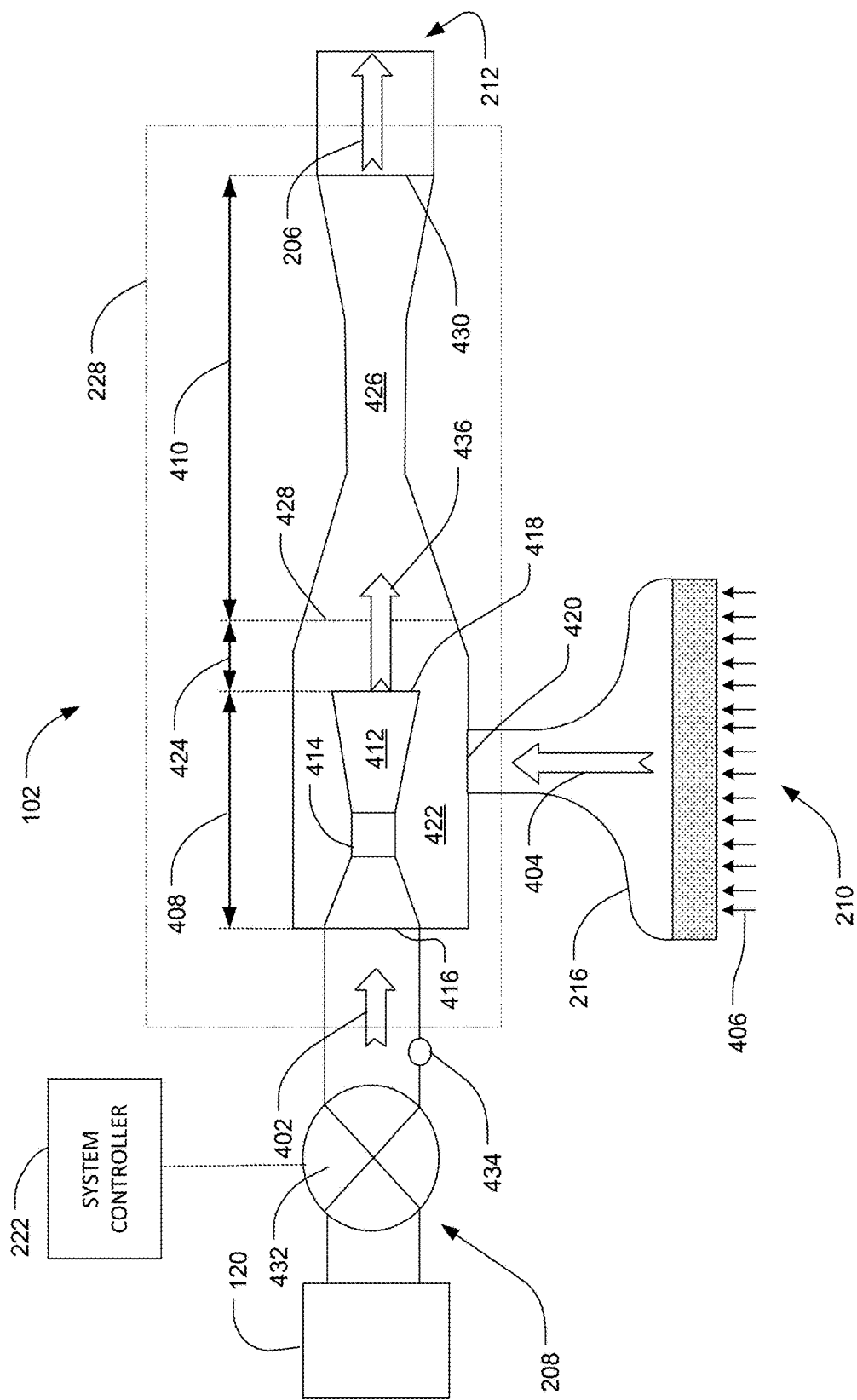
FIG. 4 is a schematic illustration of the example drag modification system of FIGS. 1, 2A, 2B and 3.

FIG. 4 is a schematic illustration of the example drag modification system 102 of FIGS. 1, 2A, 2B, and 3. In operation, the first inlet 208 receives a high energy or motive fluid 402 (e.g., a primary motive fluid, compressed air, or pressurized fluid from the pressurized fluid source 120) to be received by the fluid mixer 228. The motive fluid 402 has fluid flow parameters to generate a suction at the second inlet 210 to entrain a secondary fluid 404 (e.g., air) from the intake plenum 216 into the high energy or motive fluid 402 flowing through the fluid mixer 228 and discharges via the outlet 212.

To generate suction at the second inlet 210, the passageway 202 and/or the fluid mixer 228 of the illustrated example includes a nozzle 408 and a diffuser 410. The nozzle 408 defines a nozzle passageway 412 having a nozzle throat 414 between a nozzle inlet 416 (e.g., a primary inlet) and a nozzle outlet 418. The nozzle inlet 416 is fluidly coupled to or in fluid communication with the first inlet 208. Additionally, the passageway 202 and/or the fluid mixer 228 defines a suction inlet 420 (e.g., a secondary inlet). The suction inlet 420 is fluidly coupled to or in fluid communication with the second inlet 210. In the illustrated example, the suction inlet 420 is in fluid communication with a suction chamber 422 defined by the passageway 202 and/or the fluid mixer 228. The passageway 202 and/or the fluid mixer 228 of the illustrated example includes a mixing zone 424 (e.g., a throat area of the passageway 202) located between the nozzle 408 and the diffuser 410. Specifically, the mixing zone 424 is located downstream from the suction chamber 422 and upstream from the diffuser 410. Additionally, the nozzle outlet 418 of the nozzle 408 is in fluid communication with the mixing zone 424 and downstream from the suction inlet 420. In other words, the nozzle outlet 418 is located downstream from the suction chamber 422 and/or the suction inlet 420 such that the motive fluid 402 exits into the mixing zone 424 via the nozzle outlet 418. The diffuser 410 of the illustrated example defines a diffuser passageway 426 having a diffuser inlet 428 and a diffuser outlet 430. The diffuser inlet 428 is fluidly coupled to and/or in fluid communication from with the mixing zone 424 and the diffuser outlet 430 is fluidly coupled to and/or in fluid communication with the outlet 212. The diffuser outlet 430 of the illustrated example defines a converging-diverging outlet.

In operation, the drag modification system 102 activates during certain flight phases. For example, the drag modification system 102 activates during a cruise phase of flight to modify (e.g., reduce) drag during cruise. To activate the drag modification system 102, the drag modification controller 230 operates a first control valve 432 (e.g., a primary motive fluid valve). The drag modification controller 230 causes a first control valve 432 to move between an open position to allow the motive fluid 402 to flow from the pressurized fluid source 120 to the first inlet 208 and/or the first nozzle inlet 416 and a closed position to prevent the motive fluid 402 from flowing from the pressurized fluid source 120 to the first inlet 208 and/or the first nozzle inlet 416. The first control valve 432 can be a pneumatically actuated fluid valve, an electrically actuated fluid valve, a shut off valve (SOV), a high pressure shut off valve (HPSOV), a normally closed fluid valve and/or any other flow control device. To detect a flow parameter of the motive fluid 402, the drag modification system 102 includes a first sensor 434. The first sensor 434 (e.g., outputs from the first sensor 434) can be used by the system controller 222 to detect a pressure, a velocity, a mass flow rate and/or fluid flow parameter of the motive fluid 402 to be received from the pressurized fluid source 120. In some examples, the system controller 222 modulates the first control valve 432 based on output signal(s) from the first sensor 434. In some examples, the drag modification system 102 does not include the first sensor 434. In some examples, the system controller 222 receives flow characteristic information of the motive fluid 402 from the main controller (e.g., FMS, FADEC, or ECSC). In some examples, the drag modification system 102 of the illustrated example can include a pressure regulator (e.g., positioned downstream from the first control valve) to regulate a pressure of the motive fluid 402 prior to flowing to the first inlet 208 and/or the nozzle inlet 416.

The first inlet 208 receives the motive fluid 402 (e.g., a pressurized fluid) from the pressurized fluid source 120 of FIG. 1 and provides the motive fluid 402 to the nozzle inlet 416. For example, the first inlet 208 receives pressurized fluid from the cabin air system 122 of FIG. 1. A pressure of the motive fluid 402 at the first inlet 208 is greater than a pressure of the secondary fluid 404 at the second inlet 210 and/or the suction inlet 420. In other words, a pressure or energy of the pressurized fluid at the first inlet 208 is greater than a pressure of the boundary layer airflow to be received at the second inlet 210.

As the motive fluid 402 flows through the nozzle 408, a pressure of the motive fluid 402 decreases and a velocity of the motive fluid 402 increases. For example, the motive fluid has a velocity at the nozzle outlet 418 that is greater than a velocity of the motive fluid 402 at the nozzle inlet 416 and the motive fluid 402 has a pressure at the nozzle outlet 418 that is less than a pressure of the motive fluid 402 at the nozzle inlet 416. The nozzle outlet 418 discharges the motive fluid 402 into the mixing zone 424. When the motive fluid 402 discharges from the nozzle outlet 418 into the mixing zone 424, a low-pressure region (e.g., a pressure drop) forms in the passageway 202 and/or the fluid mixer 228 that causes or otherwise generates a suction in the suction chamber 422 and/or at the suction inlet 420. As a result, the motive fluid 402 generates a suction at the suction inlet 420 and/or within the suction chamber 422. The suction generated at the suction inlet 420 causes the passageway 202 to receive the secondary fluid 404 entrained from the intake plenum 216 (e.g., the boundary layer airflow 406). In other words, the suction inlet 420 generates a suction at the second inlet 210 to intake (e.g., ingest or siphon off) boundary layer airflow 406 from the fuselage 104 and cause the secondary fluid 404 to flow to the mixing zone 424. In other words, the second inlet 210 and/or the intake plenum 216 receive a boundary layer airflow as a result of a negative pressure gradient effectuated by entrainment of air from the intake plenum 216 into the fluid mixer 228.

The secondary fluid 404 mixes with the motive fluid 402 in the mixing zone 424 to provide the mixed fluid 436. The diffuser 410 reduces a velocity of the mixed fluid 436 (e.g., to pipeline velocities), which allows recovery (e.g., an increase) of a pressure of the mixed fluid 436 as the mixed fluid 436 exits the diffuser outlet 430. The diffuser outlet 430 is fluidly coupled and/or in fluid communication with the outlet 212 to enable the mixed fluid 436 to discharge via the outlet 212. In the illustrated example, the mixed fluid 436 discharges into the wake region 118 (FIG. 1) of the aircraft 100 during flight to reduce drag. To deactivate the drag modification system 102, the system controller 222 operates and/or otherwise causes the first control valve 432 to move to a closed position to prevent the motive fluid 402 from flowing to the first inlet 208 and/or the nozzle inlet 416.

Figure 5A:
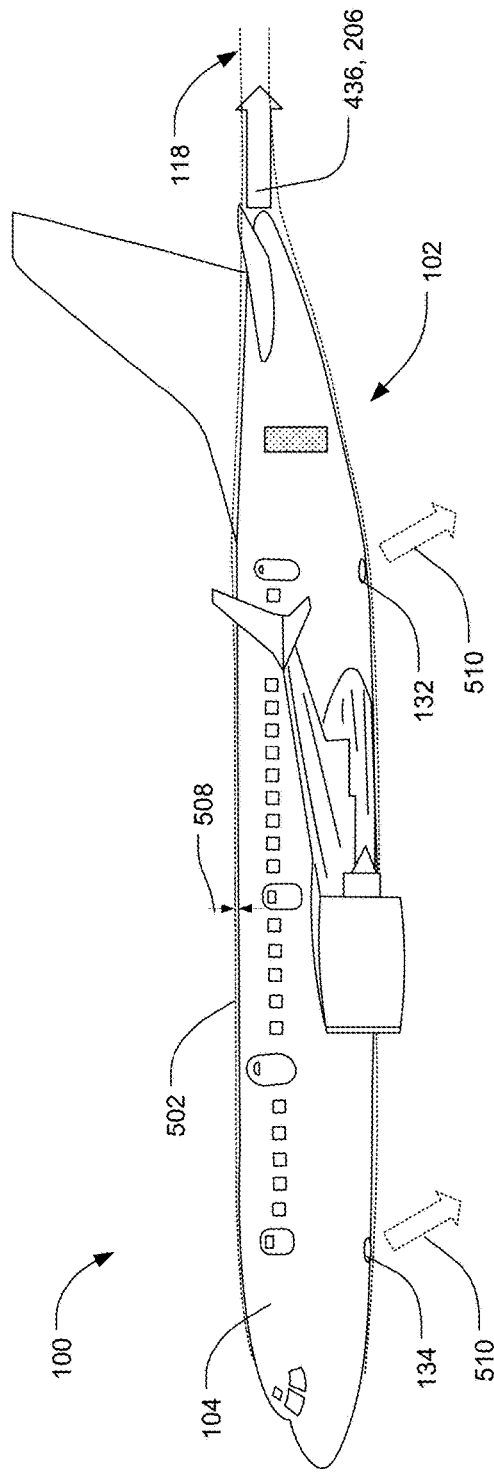
FIG. 5A is a side view of the example aircraft of FIG. 1 illustrating an example boundary layer profile of the aircraft of FIG. 1 when modified by the example drag modification system of FIGS. 1, 2A, 2B, 3, and 4.
Figure 5B:
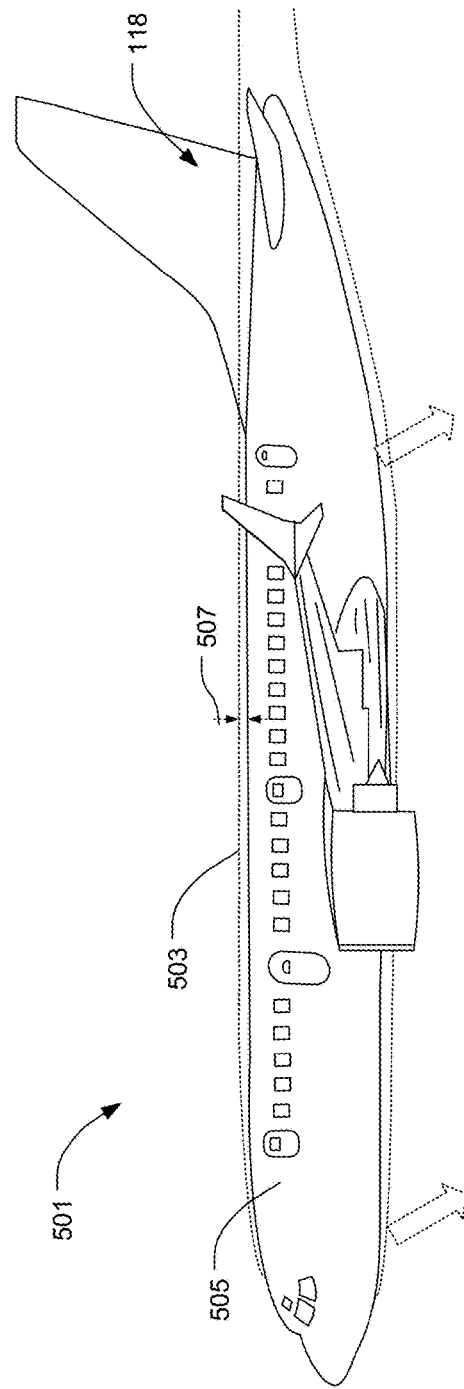
FIG. 5B is a side view of another example aircraft illustrating an example boundary layer profile of the aircraft when not modified by the example drag modification system of FIGS. 1, 2A, 2B, 3, and 4.

FIG. 5A is a side view of the aircraft 100 of FIG. 1 illustrating a representation of a boundary layer 502 provided by the drag modification system 102 disclosed herein. FIG. 5B is a side view an aircraft 501 similar to the aircraft 100 of FIG. 1 illustrating a representation of a boundary layer 503 when the aircraft 501 is not implemented with the drag modification system 102 disclosed herein.

Referring to FIG. 5A, as a result of the drag modification system 102 ingesting or siphoning off boundary layer airflow 406, the drag modification system 102 of the illustrated example reduces drag. In some examples, the drag modification system 102 of the illustrated example can reduce drag by a factor of four when implemented with some aircraft (e.g., the aircraft 100). To reduce drag, the drag modification system 102 of the illustrated example modifies the boundary layer 502. For example, the drag modification system 102 of the illustrated example reduces and/or at least partially eliminates the boundary layer 502. To modify a profile of the boundary layer 502, the drag modification system 102 causes a velocity and/or acceleration of the boundary layer airflow 406 to increase during flight. Such increase in velocity and/or acceleration of the boundary layer airflow 406 ensures or induces a laminar profile of the boundary layer 502 by causing the boundary layer 502 to remain closer to the fuselage 104 (e.g., the fuselage skin 204a of the fuselage 104). By reducing and/or eliminating the boundary layer 502, the boundary layer 502 does not build up and/or spill into the wake region 118 of the aircraft 100, which reduces drag. Additionally, the mixed fluid 436 exhausts into the wake region 118, which reduces drag and/or increases thrust recovery efficiencies.

In contrast, referring to FIG. 5B, a profile of the boundary layer 503 of the aircraft 501 separates from a fuselage 505 of the aircraft 501. Such separation, in some instances, can induce a turbulent profile. For example, the boundary layer 503 separates from the fuselage 505 a distance 507 that is greater than a distance 508 at which the boundary layer 502 separates from the fuselage 104 when the aircraft 100 and 501 are at the same altitude and moving at the same speeds in the same environmental conditions. As the boundary layer 503 of FIG. 5B builds up and/or separates from the fuselage 505, the boundary layer 503 spills into the wake region 118 of the aircraft, which increases drag.

In addition, referring to FIG. 5A, the aircraft 100 experiences further thrust recovery from cabin air 510 discharged from the cabin 130 via the primary and/or secondary outflow valves 132, 134. Thus, the mixed fluid 436 provides thrust recovery in addition to thrust recovery from discharged cabin air 510. In some examples, the first inlet 208 and/or the nozzle inlet 416 (FIG. 4) can receive cabin air as the motive fluid 402. For example, instead of removing the cabin air 510 via the via the primary and/or secondary outflow valves 132, 134, the cabin air 510 can be channeled to the first inlet 208 and/or the nozzle inlet 416 to provide the motive fluid 402. In some such examples, the primary and/or secondary outflow valves 132, 134 can be commanded by the system controller 222 to remain closed and a separate valve (not shown), can be operated to discharge the cabin air 510 to the first inlet 208 when the drag modification system 102 is activated. In some examples, the cabin air system 122 can replace the cabin air 510 using a combination of the primary and/or secondary outflow valves 132, 134 and the drag modification systems 102.

Figure 6:
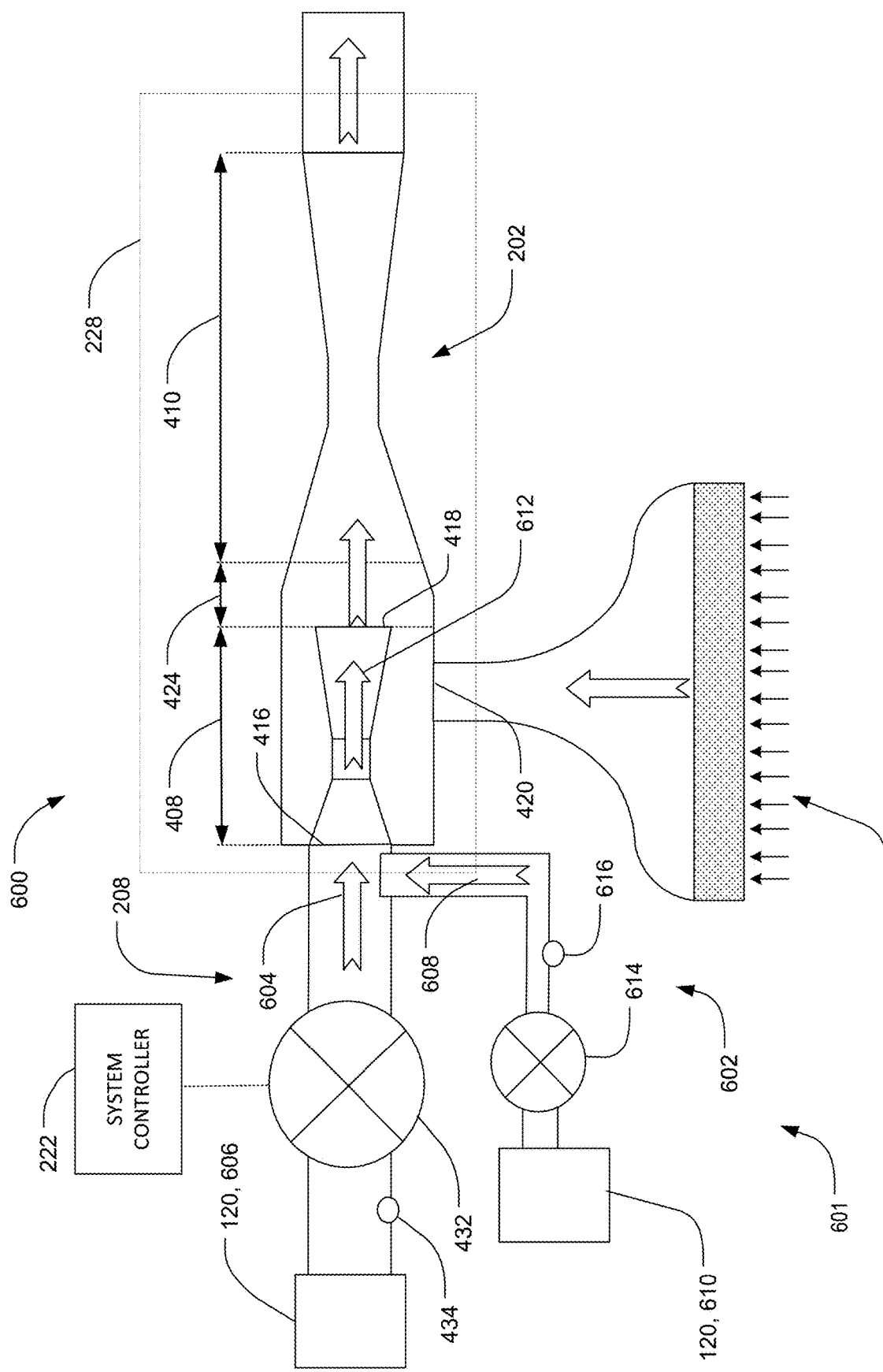
FIG. 6 is a schematic illustration of another example drag modification system disclosed herein that can implemented the example aircraft of FIG. 1.

FIG. 6 illustrates another example drag modification system 600 disclosed herein that can be implemented on an aircraft such as, for example, the aircraft 100 of FIG. 1. Many of the components of the example drag modification system 600 of FIG. 6 are substantially similar or identical to the components of the drag modification system 102 described above in connection with FIGS. 1, 2A, 2B, 3, 4 and 5A. As such, those components will not be described in detail again below. Instead, the interested reader is referred to the above corresponding descriptions for a complete written description of the structure and operation of such components. To facilitate this process, identical reference numbers will be used for structures in FIG. 6 that correspond to structures in FIGS. 1, 2A, 2B, 3, 4 and 5A. For example, the drag modification system 600 of the illustrated example includes a passageway 202 and/or a fluid mixer 228 including a nozzle 408, a diffuser 410, and a mixing zone 424 positioned between the nozzle 408 and the diffuser 410, and a system controller 222.

Referring to FIG. 6, the drag modification system 600 of the illustrated example is substantially similar to the drag modification system 102 except that drag modification system 600 enables high energy airflow or motive fluid (e.g., pressurized fluid) from multiple pressurized fluid sources 120 (e.g., two or more of the pressurized fluid sources 120 of FIG. 1). For example, the drag modification system 600 of the illustrated example includes a supplemental motive fluid system 601.

In the illustrated example, the drag modification system 600 of the illustrated example includes a first inlet 208 (e.g., a primary inlet), a second inlet 210 (e.g., a secondary inlet), and a third inlet 602 (e.g., a tertiary inlet). For example, a nozzle inlet 416 of the nozzle 408 of the fluid mixer 228 can receive a first motive fluid 604 (e.g., the motive fluid 402 of FIG. 4) from a first pressurized fluid source 606 and/or a second motive fluid source 608 (e.g., a supplemental motive fluid) from a second pressurized fluid source 610 different from the first pressurized fluid 606. For example, the first motive fluid 604 can be pressurized cabin air from the cabin air system 122 and the second motive fluid 608 can be pressurized fluid from the cabin trim air systems 124, the anti-icing system 126, pressurized fluid from the fan 128 (e.g., fan air), and/or any other pressurized fluid source 120 of the aircraft 100. In some examples, a fluid parameter of the first motive fluid 604 is different than a fluid parameter of the second motive fluid 608. For example, a pressure, velocity and/or temperature of the first motive fluid 604 can be less than a pressure, velocity and/or temperature of the second motive fluid 608. For example, the second motive fluid 608 has a higher energy than the first motive fluid 402 and/or 604. In some examples, the fluid parameters of the first motive fluid 604 and the second motive fluid 608 are similar (e.g., identical).

During operation, the drag modification system 600 of FIG. 6 can receive the first motive fluid 604, the second motive fluid 608, or a combined motive fluid 612 provided by the first motive fluid 604 and the second motive fluid 608 to generate or provide a suction at the second inlet 210 and/or the suction inlet 420 and entrain air from the intake plenum 216 into the high energy airflow via the fluid mixer 228. For example, the drag modification system 600 can receive the first motive fluid 604, without receiving or using the second motive fluid 608, if the first pressurized fluid source 606 can provide the first motive fluid 604 with a desired fluid parameter (e.g., a pressure, volume and/or mass flow rate) that is sufficient to provide or generate a suction at the second inlet 210 and/or a suction inlet 420 when the first motive fluid 604 discharges from the nozzle outlet 418. Alternatively, the drag modification system 600 can receive the second motive fluid 608, without receiving or using the first motive fluid 604, if the second pressurized fluid source 610 can provide the second motive fluid 608 with a desired fluid parameter (e.g., a pressure, volume and/or mass flow rate) that is sufficient to provide or generate a suction at the second inlet 210 and/or a suction inlet 420 when the second motive fluid 608 discharges from the nozzle outlet 418. In some examples, the drag modification system 600 can receive the first motive fluid 604 and the second motive fluid 608 to provide the combined motive fluid 612 with a desired fluid parameter (e.g., has a pressure, volume and/or mass flow rate) that is sufficient to provide a suction at the second inlet 210 and/or a suction inlet 420. In some examples, the drag modification system 600 of the illustrated example can select between the first motive fluid 604, the second motive fluid 608 and/or the combined motive fluid 612 based on an availability of the first pressurized fluid source 606 and/or the second pressurized fluid source 610 during a flight schedule. In some examples, the drag modification system 600 can select between the first motive fluid 604, the second motive fluid 608 and/or the combined motive fluid 612 based on an efficiency (e.g., optimized or maximum efficiency) of the aircraft system(s) and/or any other operational scheme. In some instances, the second motive fluid 608 provides a back-up or fail-safe system if the first motive fluid 604 is not available and/or the first pressurized fluid source 606 cannot produce the first motive fluid 604 with fluid parameter(s) and/or characteristic(s) sufficient to generate a suction at the second inlet 210 and/or the suction inlet 420. In such example, the second motive fluid 608 can supplement the first motive fluid 604 to provide a motive fluid (e.g., the combined motive fluid 612) having fluid parameter(s) and/or characteristic(s) to generate suction at the second inlet 210 and/or the suction inlet 420.

To control fluid flow of the first motive fluid 604 to the nozzle inlet 416, the drag modification system 600 includes a first control valve 432. Likewise, to control fluid flow of the second motive fluid 608 to the nozzle inlet 416, the drag modification system 600 includes a second control valve 614 (e.g., a supplemental motive fluid valve). The system controller 222 operates the first control valve 432 and the second control valve 614. Thus, the system controller 222 operates the first control valve 432 (e.g., between an open position and a closed position) and the second control valve 614 (e.g., between an open position and a closed position) to provide the first motive fluid 604, the second motive fluid 608, and/or the combined motive fluid 612 to the nozzle inlet 416. To detect a flow parameter of the first motive fluid 604 and the second motive fluid 608, respectively, the drag modification system 600 includes a first sensor 434 and a second sensor 616. The first sensor 434 (e.g., outputs from the first sensor 434) can be used by the system controller 222 to detect a pressure, a velocity, a mass flow rate and/or fluid flow parameter of the first motive fluid 604 to be received from the first pressurized fluid source 606. The second sensor 616 (e.g., outputs from the second sensor 616) can be used by the system controller 222 to detect a pressure, a velocity, a mass flow rate and/or fluid flow parameter of the second motive fluid 608 to be received from the second pressurized fluid source 610. In some examples, the system controller 222 modulates the first control valve 432 based on output signal(s) from the first sensor 434 to provide the first motive fluid 604, modulates the second control valve 614 based on output signal(s) from the second sensor 616 to provide the second motive fluid 608, and/or modulates the first control valve 432 and the second control valve 614 based on input signals from the first sensor 434 and the second sensor 616 to provide the combined motive fluid 612 having desired or target fluid parameters (e.g., pressure, velocity, mass flow rate, etc.). In some examples, the drag modification system 600 does not include the first sensor 434 and/or the second sensor 616. In some examples, the system controller 222 receives flow characteristic information of the first motive fluid 604 and/or the second motive fluid 608 from the main controller (e.g., FMS, FADEC, or ECSC). In some examples, the drag modification system 600 of the illustrated example can include a first pressure regulator (e.g., positioned downstream from the first control valve 432) to regulate a pressure of the first motive fluid 604 prior to flowing to the first inlet 208 and/or the nozzle inlet 416 and a second pressure regulator (e.g., positioned downstream from the second control valve 614) to regulate a pressure of the second motive fluid 618 prior to flowing to the third inlet 602 and/or the nozzle inlet 416. The drag modification system 600 (e.g., the fluid mixer 228) functions substantially similar to the drag modification system 102 of FIGS. 1, 2A, 2B, 3, 4, and 5A. Thus, for brevity, the operation of the drag modification system 600 will not be described.

Figure 7A:
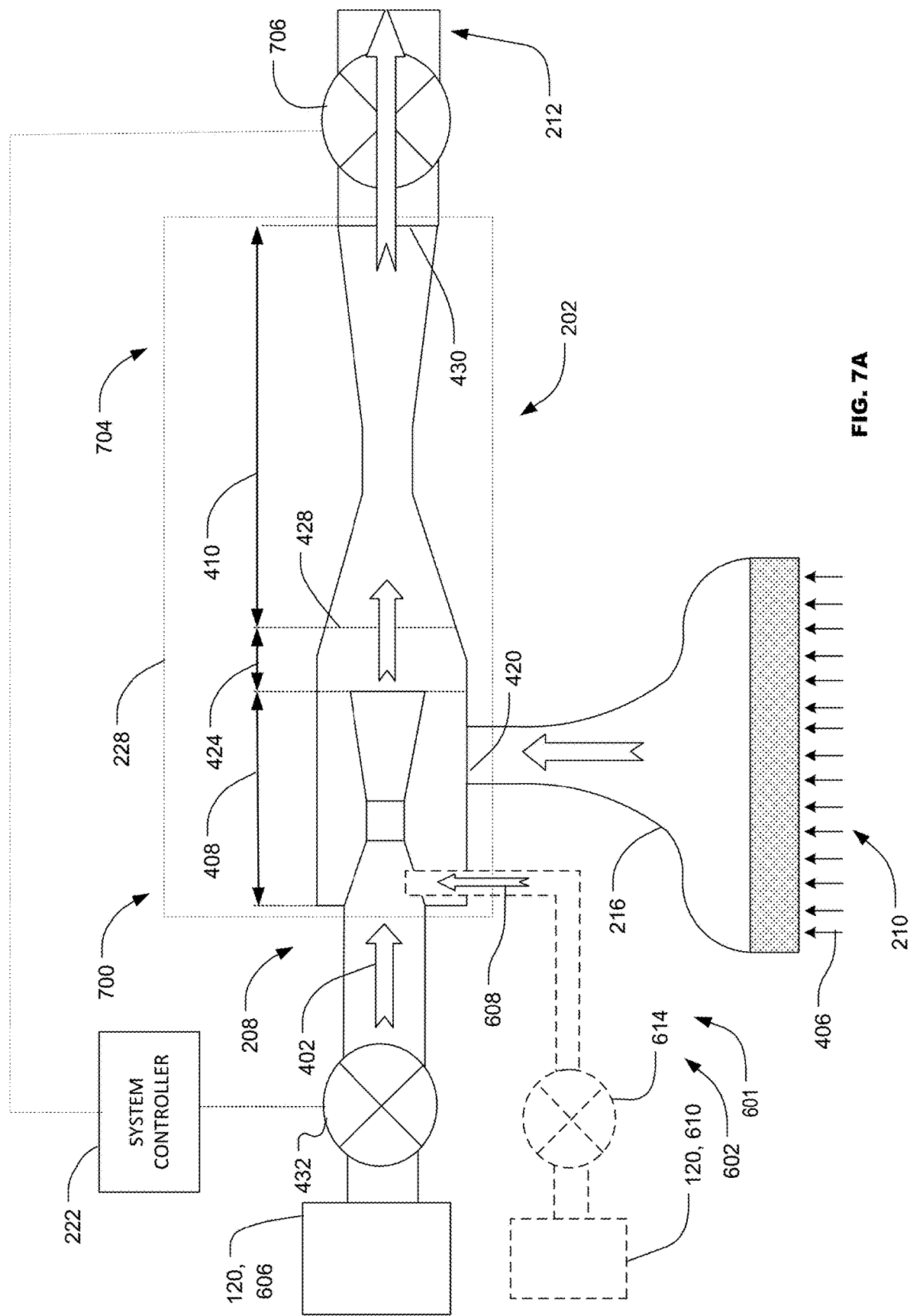
FIGS. 7A and 7B are schematic illustrations of another example drag modification system disclosed herein that can implemented the example aircraft of FIG. 1.
Figure 7B:
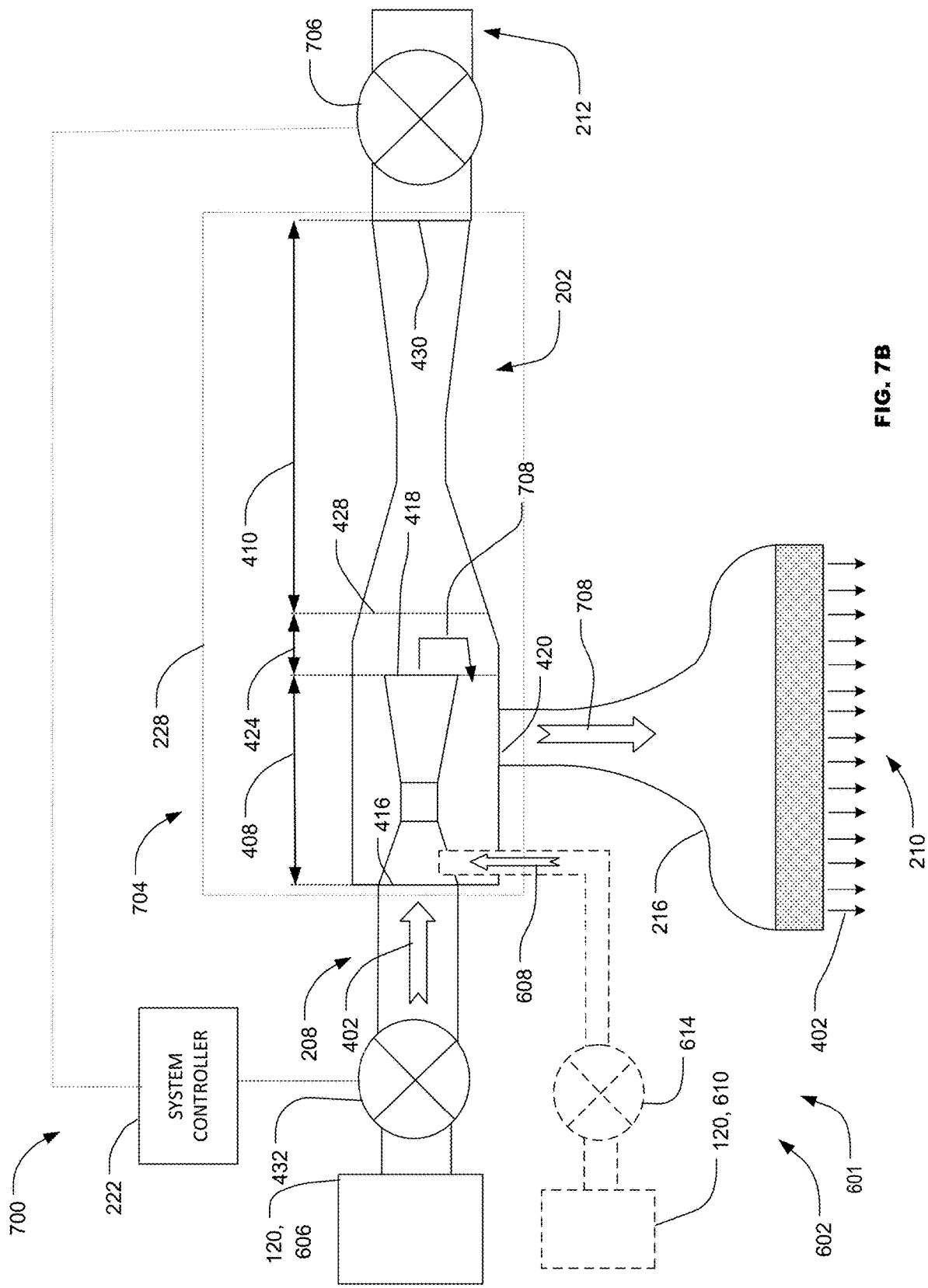

FIGS. 7A and 7B are schematic illustrations of another example drag modification system 700 disclosed herein that can implement an aircraft such as, for example, the aircraft 100 of FIG. 1. Many of the components of the example drag modification system 700 of FIGS. 7A and 7B are substantially similar or identical to the components of the drag modification system 102 and/or the drag modification system 600 described above in connection with FIGS. 1, 2A, 2B, 3, 4, 5A and 6. As such, those components will not be described in detail again below. Instead, the interested reader is referred to the above corresponding descriptions for a complete written description of the structure and operation of such components. To facilitate this process, identical reference numbers will be used for structures in FIGS. 7A and 7B that correspond to structures in FIGS. 1, 2A, 2B, 3, 5A and 6. For example, the drag modification system 700 of the illustrated example includes a passageway 202 and/or a fluid mixer 228 including a nozzle 408, a diffuser 410, and a mixing zone 424 positioned between the nozzle 408 and the diffuser 410, and a system controller 222. In some examples, the drag modification system 700 can include the third inlet 602 of FIG. 6.

The drag modification system 700 of the illustrated example operates between a first mode of operation 702 to reduce drag and a second mode of operation 704 to increase drag. For example, the drag modification system 700 of the illustrated example can operate in the first mode of operation 702 to decrease drag during a first flight phase (e.g., cruise, take-off, etc.) and operate in the second mode of operation 704 to increase drag during a second flight phase (e.g., descent, landing, etc.). For example, in the first mode of operation 702, the drag modification system 700 induces or promotes a laminar boundary layer profile during flight to reduce drag and, in the second mode of operation 704, the drag modification system 700 induces or promotes a turbulent boundary layer profile during flight to increase drag.

The drag modification system 700 of the illustrated example includes a third control valve 706 at the outlet 212 of the passageway 202. Specifically, the third control valve 706 is positioned between the diffuser outlet 430 of the diffuser 410 and the outlet 212 of the passageway 202. In operation, the system controller 222 operates the third control valve 706 between an open position and a closed position.

In the first mode of operation 702 to reduce drag shown in FIG. 7A, the system controller 222 moves the third control valve 706 to an open position to allow fluid flow through the outlet 212. When the third control valve 706 is moved to the open position, the drag modification system 700 operates substantially similar (e.g., identical) to the drag modification system 102 of FIGS. 1, 2A, 2B, 3, 4, and 5A. For example, the system controller 222 can activate the drag modification system 102 by controlling, commanding and/or otherwise causing the first control valve 432 and the third control valve 706 to move to respective open positions. In this manner, the motive fluid 402 from a first pressurized fluid source 606 flows to the nozzle inlet 416 and discharges from the nozzle outlet 418 to cause or create a suction at the suction inlet 420 and/or the second inlet 210 that draws the boundary layer airflow 406 into the intake plenum 216. The secondary fluid 404 entrained from the intake plenum 216 mixes with the motive fluid 402 in the mixing zone 424 and discharges from the diffuser outlet 430. The third control valve 706 allows the mixed fluid 436 (e.g., a high energy fluid flow) to flow or discharge from the outlet 212 (e.g., into the wake region 118).

In some examples, the drag modification system 700 can include a third inlet 602 that provides a second motive fluid 608 (e.g., a supplemental motive fluid). The drag modification system 700 when implemented with the third inlet 602 operates substantially similar to the drag modification system 600 of FIG. 6.

In the second mode of operation 704 to increase drag shown in FIG. 7B, the system controller 222 moves the third control valve 706 to a closed position to prevent or restrict fluid flow through the outlet 212 and/or the diffuser outlet 430. Additionally, the system controller 222 operates and/or causes the first control valve 432 to move to an open position to allow the motive fluid to flow into the nozzle 408 and/or the diffuser 410. Because the third control valve is in the closed position, the motive fluid is prevented from flowing to the outlet 212. Because the motive fluid 402 is prevented from flowing or discharging from the outlet 212, the motive fluid 402 does not create a suction at the suction inlet 420 and/or the second inlet 210. Additionally, a pressure of the motive fluid is greater than a pressure (e.g., atmospheric pressure) of airflow external to the aircraft 100. As a result, the pressurized fluid provided by the motive fluid 402 that exits the nozzle outlet 418 flows through second inlet 210 and exits or discharges from the intake plenum 216 adjacent the external surface of the fuselage 104 of the aircraft 100. The pressurized airflow provided by the motive fluid 402 adjacent (e.g., along) the external surface of the fuselage 104 affects and/or interrupts the boundary layer airflow. As a result, the pressurized fluid provided by the motive fluid 402 exiting or discharging from the second inlet 210 causes the boundary layer to separate from the fuselage 104 to induce a turbulent boundary layer profile. Pressurized fluid provided by the motive fluid 402 exiting the second inlet 210 causes a boundary layer to build and spill into the wake region 118 during flight and thereby increase drag. For example, increasing drag during descent can reduce a speed of the aircraft. In some examples, increasing drag during descent reduces a distance needed to compete the decent phase, allowing greater travel distance of a cruise phase of a flight and thereby improving aircraft efficiency.

When the drag modification system 700 is implemented with the third inlet 602, the second motive fluid 608 can be employed in addition to, or instead of, the motive fluid 402. For example, the system controller 222 can operate the first control valve 232 and/or a second control valve 614 to provide the motive fluid 402, the second motive fluid 608 and/or a combination of the motive fluid 402 and the second motive fluid 608 (e.g., similar to the drag modification system 600 of FIG. 6) to increase drag when the drag modification system 700 is in the second mode of operation 704.

Figure 8A:
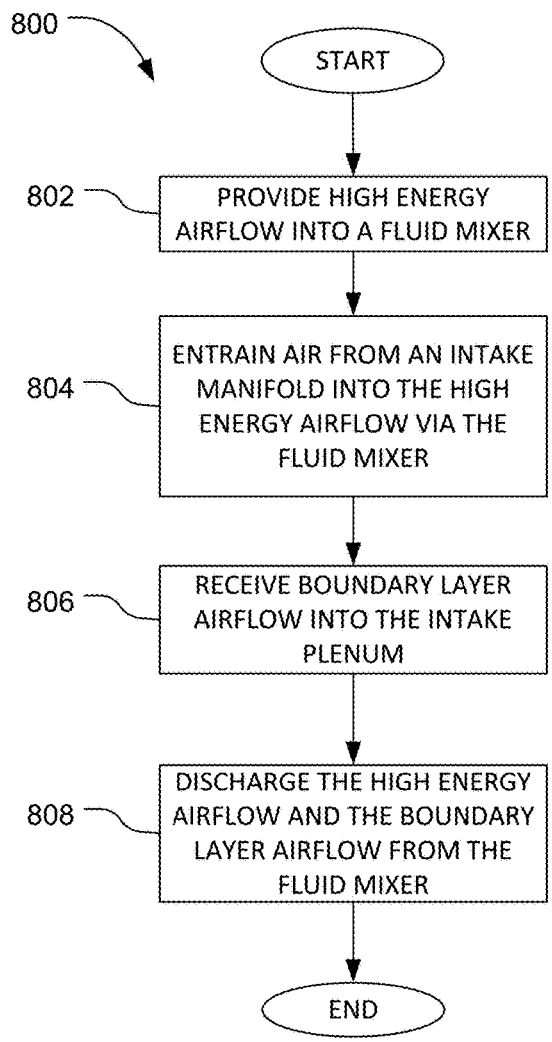
FIG. 8A is a flowchart of an example method to reduce drag using example drag modification systems disclosed herein.

FIG. 8A is a flow chart of an example method for reducing drag of an aircraft. The method 800 of FIG. 8A includes providing a high energy airflow into a fluid mixer (block 802). For example, the high energy fluid is a motive fluid (e.g., the motive fluid 402, 604, 608) provided to an inlet (e.g., the nozzle inlet 416) of the fluid mixer 228 (e.g., eductor). The high energy airflow is provided to entrain air from the intake plenum 216 into the high energy airflow via the fluid mixer 228 (block 804). As a result, a boundary layer airflow is received into the intake plenum 216 as a result of a negative pressure gradient effectuated by entrainment of air from the intake plenum into the fluid mixer 228 (block 806). The high energy airflow and the boundary layer airflow (e.g., the mixed fluid 436, the combined motive fluid 612) from the fluid mixer 228 (block 808). For example, the high energy airflow and the boundary layer airflow can discharge from the eductor into a wake of the aircraft 100 to reduce drag during flight.

Figure 8B:
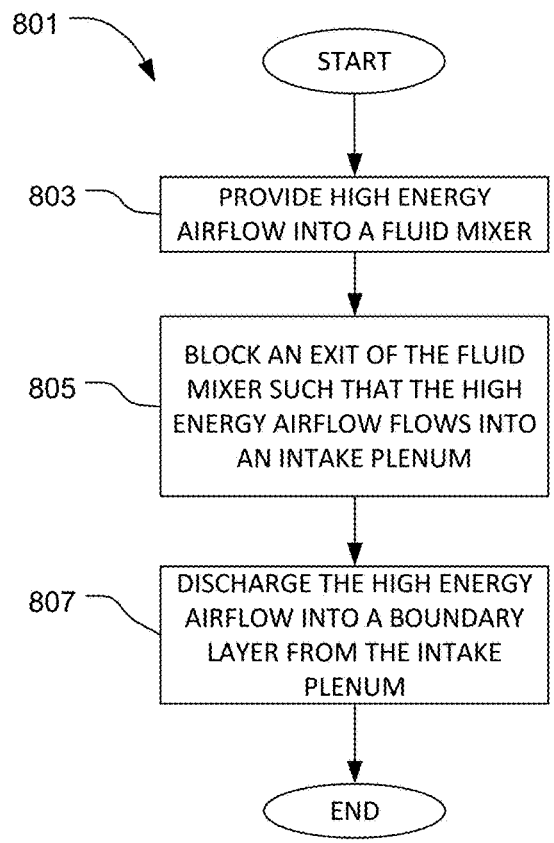
FIG. 8B is a flowchart of an example method to increase drag using example drag modification systems disclosed herein.

FIG. 8B is a flow chart of an example method for increasing drag of an aircraft. The method of 801 of FIG. 8B includes providing a high energy airflow into a fluid mixer (block 803). For example, the high energy fluid is a motive fluid (e.g., the motive fluid 402, 604, 608) provided to an inlet (e.g., the nozzle inlet 416) of the fluid mixer 228 (e.g., eductor). An exit of the fluid mixer 228 is blocked or closed such that the high energy airflow flows from the fluid mixer 228 to the intake plenum 216. For example, to block the exit (e.g., the outlet 212), the third control valve 706 moves to the closed position to prevent fluid flow through the outlet 212. The high energy airflow flow discharges into a boundary layer (e.g., the boundary layer 502) from the intake plenum 216 (e.g., the second inlet 210) as a result of a positive pressure gradient from the intake plenum 216 into ambient air (e.g., a boundary layer 502 of FIG. 5A) external to the aircraft 100 (block 807).

Figure 9:
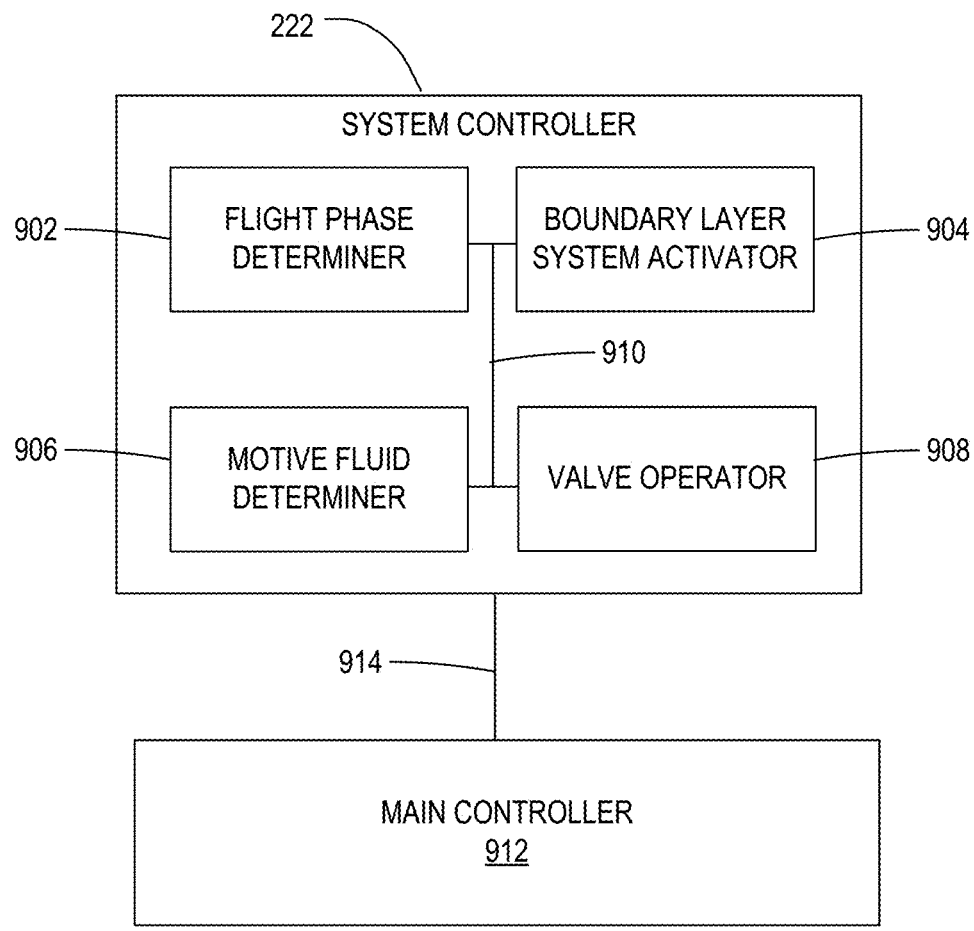
FIG. 9 is a block diagram representative of an example implementation of an example controller that may be used to implement the example drag modification systems disclosed herein.

FIG. 9 is a block diagram of an example implementation of the system controller 222 of the example drag modification system 102 of FIGS. 1, 2A, 2B, 3, 4, and 5A, the drag modification system 600 of FIG. 6, and the drag modification system 700 of FIGS. 7A and 7B. The system controller 222 of FIG. 9 includes an example flight phase determiner 902, an example boundary layer system activator 904, an example motive fluid determiner 906, and an example valve operator 908. The example flight phase determiner 902, the example boundary layer system activator 904, the example motive fluid determiner 906, and the example valve operator 908 are communicatively coupled via an example bus 910. In some examples, the system controller 222 of the illustrated example is communicatively coupled to a main controller 912 (e.g., FMS, FADEC, or ECSC) of an aircraft (e.g., the aircraft 100) via a bus 914, wireless protocol and/or any other suitable communication protocol. The system controller 222 is communicatively coupled (e.g., via an input/output interface) to one or more devices such as, for example, one or more of the first control valve 432, the second control valve 614, the third control valve 706, the first sensor 434, the second sensor 616 and/or any other system of the aircraft 100. As used herein, the phrase "in communication," including variations thereof, encompasses direct communication and/or indirect communication through one or more intermediary components, and does not require direct physical (e.g., wired) communication.

The flight phase determiner 902 of the illustrated example determines a fight phase of the aircraft 100. To determine a flight phase, the flight phase determiner 902 of FIG. 9 receives a phase of flight status from the main controller 912 via the bus 914. For example, the phase of flight is determined by the main controller 912 from one or more parameter(s) of an aircraft during flight. For example, the main controller 912 determines phase of flight based on one or more of a speed of an aircraft, revolution per minute (RPMs) of the turbine engines 108 of FIG. 1, altitude of the aircraft, and/or any other parameter(s). In some examples, the flight phase determiner 902 is configured to receive the one or more parameter(s) of the aircraft during flight to determine a phase of flight without input from the main controller 912. The phase of flight data can include, for example, taxiing, take-off, climb, cruise, descent, and landing.

The flight phase determiner 902 communicates the phase of flight status to the boundary layer system activator 904. In some examples, the flight phase determiner 902 communicates the flight phase data to memory and the boundary layer system activator 904 retrieves the flight phase data from the memory. In some examples, the flight phase determiner 902 provides and/or generates different signals (e.g., binary signals, analog, etc.) for use by the boundary layer system activator 904 that associated with each phase of flight. For example, the flight phase determiner 902 can output a first signal representative of a phase of flight associated with take-off, a second signal representative of a phase of flight associated with cruise, a third signal representative of a phase of flight associated with descent, a fourth signal representative of a phase of flight associated with landing, and a fifth signal representative of a phase of flight associated with taxiing.

The boundary layer system activator 904 activates the drag modification system 102, 600 and/or 700 disclosed herein. For example, the boundary layer system activator 904 receives, retrieves or otherwise obtains a phase of flight status from the flight phase determiner 902 and/or memory. Based on the flight phase detected by the flight phase determiner 902, the boundary layer system activator 904 activates and/or deactivates the drag modification systems 102, 600 and/or 700.

The motive fluid determiner 906 determines if a primary motive fluid and/or a supplemental motive fluid is available for use by the drag modification system 102, 600, 700. For example, the motive fluid determiner 906 receives one or more outputs from the first sensor 434 to determine, measure and/or otherwise detect one or more fluid parameter(s) or characteristic(s) of the primary motive fluid. For example, the motive fluid determiner 906 determines if the primary motive fluid (e.g., the motive fluid 402, the first motive fluid 604) has sufficient fluid flow characteristic(s) (e.g., pressure, velocity, mass flow rate, etc.) to generate suction at the second inlet 210.

The motive fluid determiner 906 determines if a supplemental or second motive fluid (e.g., the second motive fluid 608) is available at the third inlet 602. For example, the motive fluid determiner 906 can retrieve and/or receive from memory, via user input instructions, and/or preinstalled instructions or information relating to the availability of the supplemental motive fluid system. For example, the system controller 222 can be pre-configured with information indicative an availability of a supplemental motive fluid system.

When the supplemental motive fluid system is not available, the motive fluid determiner 906 can command the main controller 912 to provide a primary motive fluid from one or more pressurized fluid sources 120 of the aircraft 100. For example, the first inlet 208 can receive primary motive fluid from the cabin air system 122. If the motive fluid determiner 906 determines that the primary motive fluid from the cabin air system 122 is not sufficient, the motive fluid determiner 906 commands a primary motive fluid from a different one of the pressurized fluid sources 120 (e.g., the cabin trim air) that is fluidly coupled to the first inlet 208.

When a supplemental motive fluid is available, the motive fluid determiner 906 receives one or more outputs from the second sensor 616 to determine, measure and/or otherwise detect one or more fluid parameter(s) or characteristic(s) of the supplemental motive fluid. The motive fluid determiner determines whether to employ the primary motive fluid, a supplemental motive fluid, or a combination of the primary and supplemental motive fluids.

The valve operator 908 of the illustrated example instructs, commands and/or otherwise causes operation of the first control valve 432, the second control valve 614, and/or the third control valve 706. For example, the valve operator 908 receives one or more instructions from the boundary layer system activator 904 and/or the motive fluid determiner 906 to operate the one or more of the first control valve 432, the second control valve 614, and/or the third control valve 706. For example, the valve operator 908 sends a first signal (e.g., a binary value or logic "0" value) to the one or more of the first control valve 432, the second control valve 614, and/or the third control valve 706 to move the one or more of the first control valve 432, the second control valve 614, and/or the third control valve 706 to move the one or more of the first control valve 432, the second control valve 614, and/or the third control valve 706 to respective closed positions, and sends a second signal (e.g., a binary value or logic "1" value) different than the first signal to the one or more of the first control valve 432, the second control valve 614, and/or the third control valve 706 to move the one or more of the first control valve 432, the second control valve 614, and/or the third control valve 706 to respective open positions.

While an example manner of implementing the drag modification system controller of FIGS. 1, 2A, 2B, 3, 4, 5A, 6, 7A and 7B is illustrated in FIG. 9, one or more of the elements, processes and/or devices illustrated in FIG. 9 may be combined, divided, re-arranged, omitted, eliminated and/or implemented in any other way. Further, the example flight phase determiner 902, the example boundary layer system activator 904, the example motive fluid determiner 906, and the example valve operator 908 and/or, more generally, the example system controller 222 of FIGS. 1, 2A, 2B, 3, 4, 5A, 6, 7A and 7B may be implemented by hardware, software, firmware and/or any combination of hardware, software and/or firmware. Thus, for example, any of the example the example flight phase determiner 902, the example boundary layer system activator 904, the example motive fluid determiner 906, and the example valve operator 908 and/or, more generally, the example system controller 222 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example flight phase determiner 902, the example boundary layer system activator 904, the example motive fluid determiner 906, and the example valve operator 908 and/or, more generally, the example system controller 222 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system controller 222 of FIGS. 1, 2A, 2B, 3, 4, 5A, 6, 7A and 7B may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
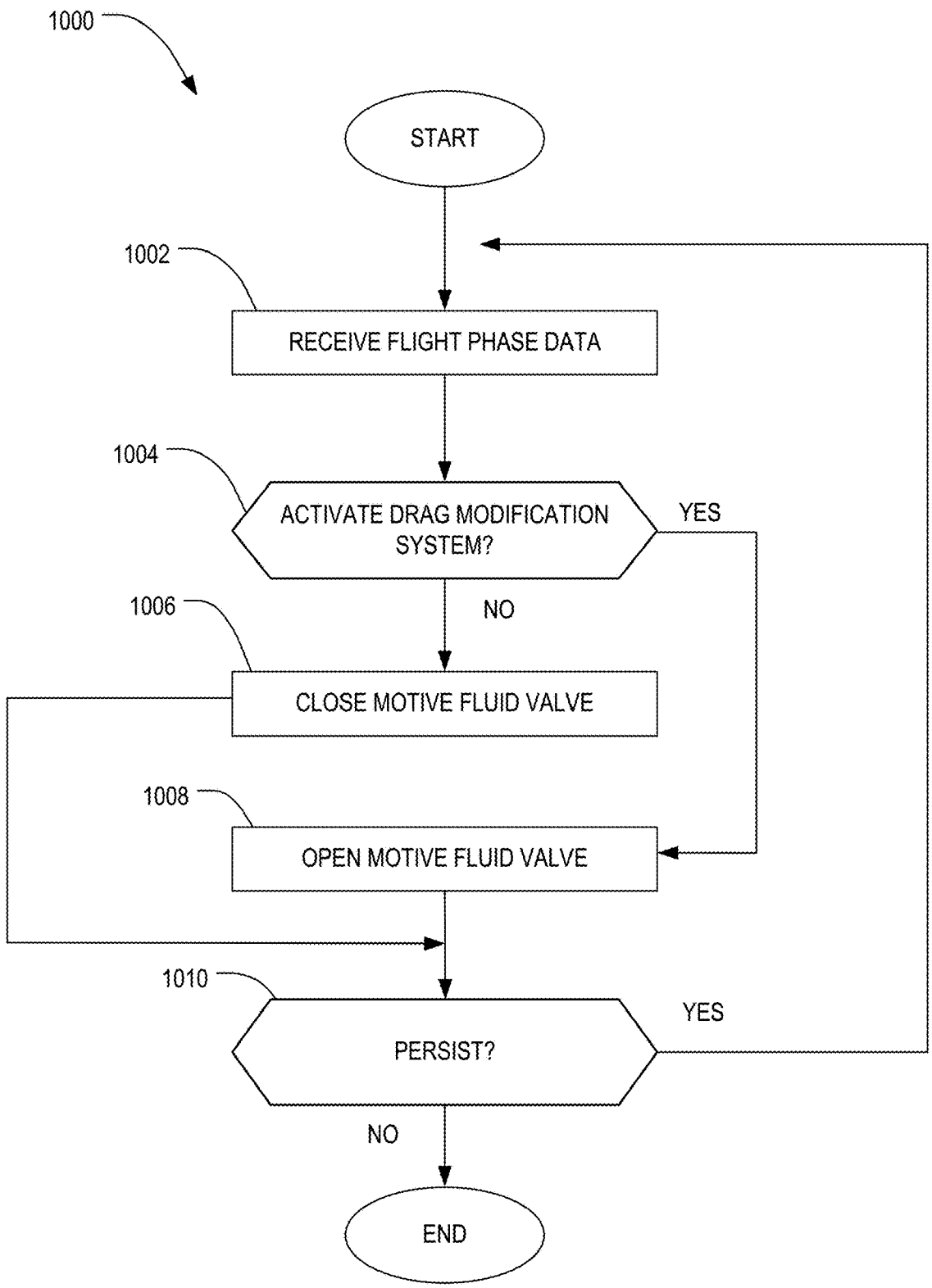
FIGS. 10-12 are flowcharts representative of example machine readable instructions that may be executed to implement the example controller of FIG. 9.
Figure 11:
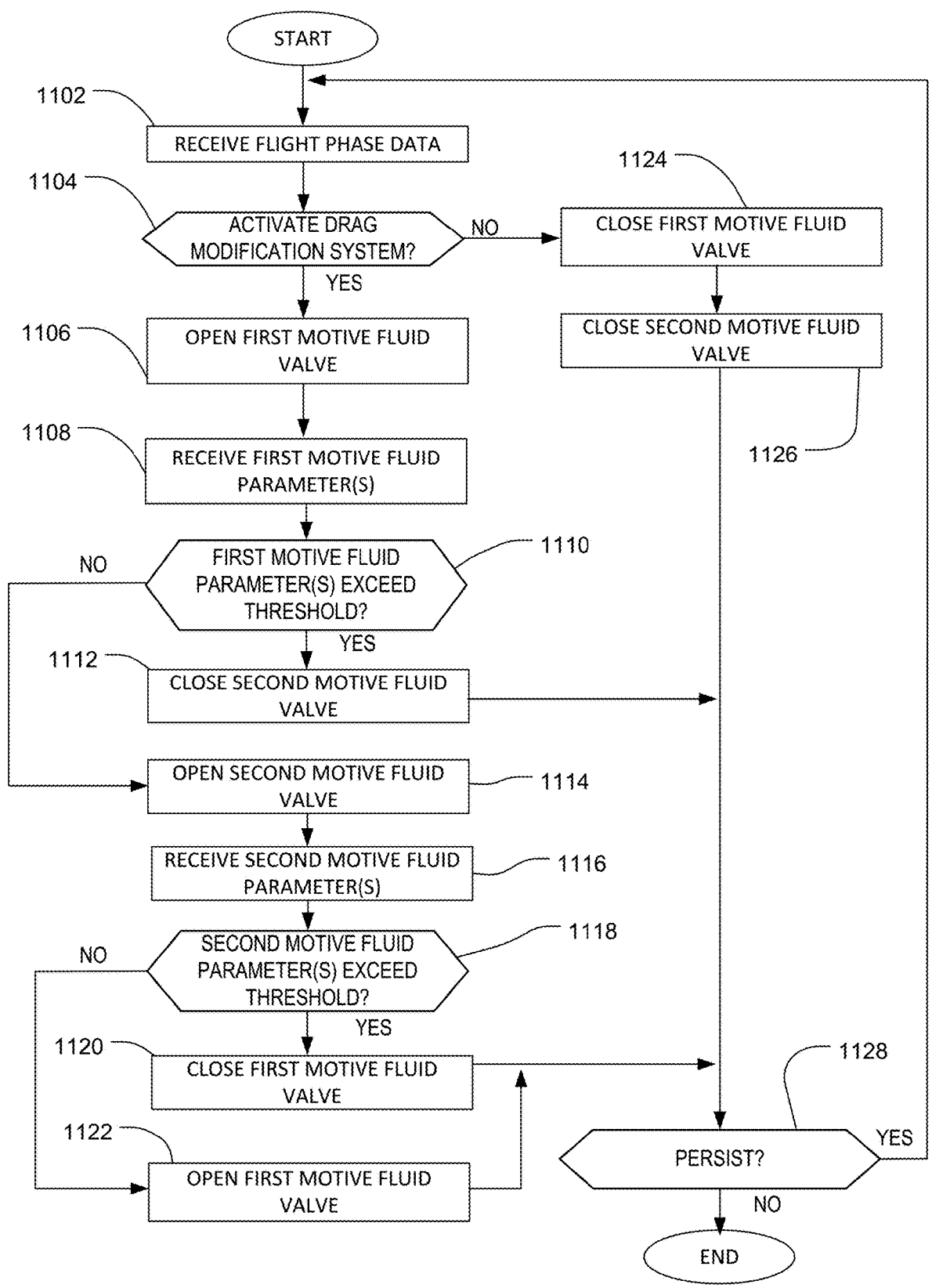
Figure 12:
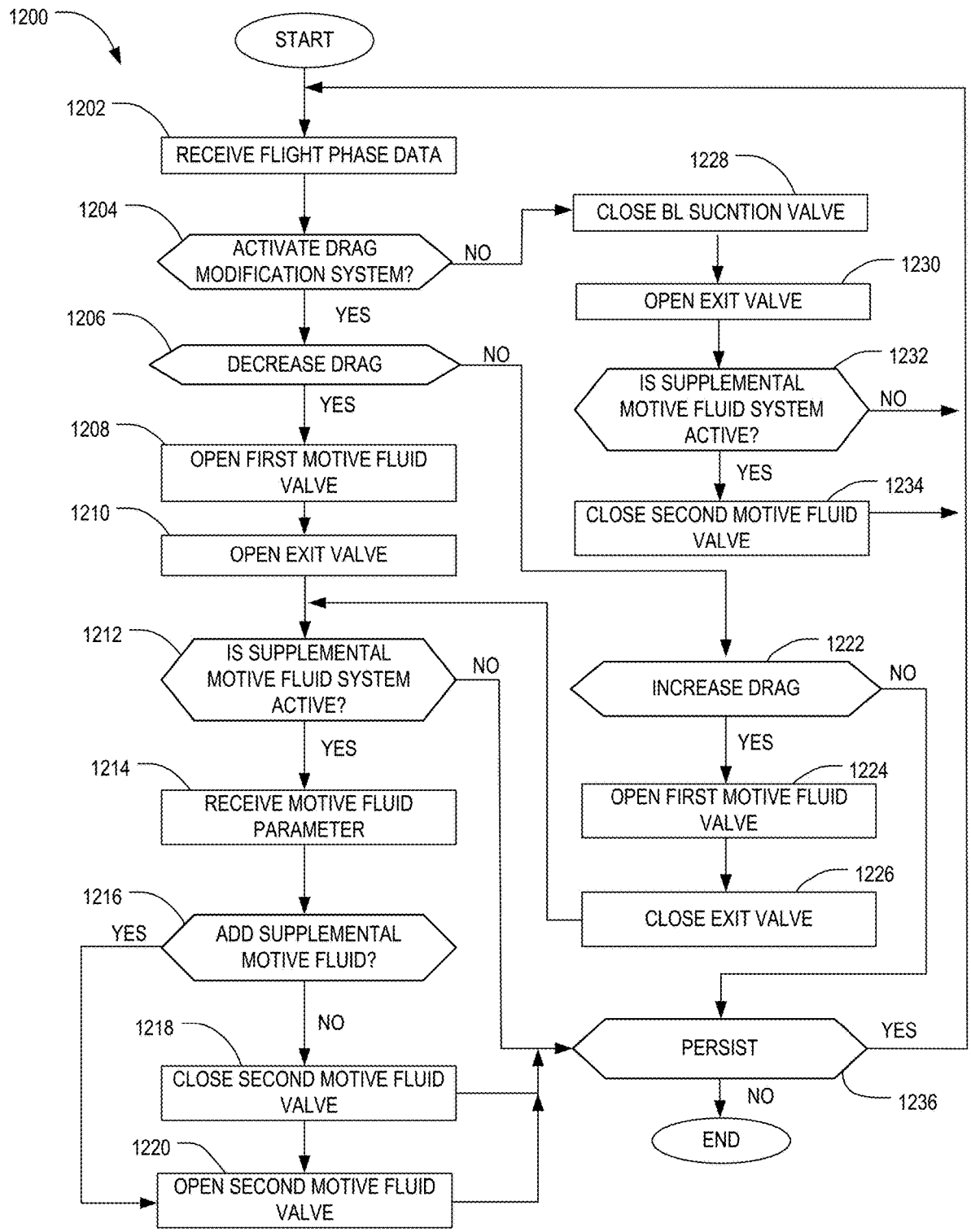

Flowcharts representative of example hardware logic, machine readable instructions, hardware implemented state machines, and/or any combination thereof for implementing the system controller 222 of FIGS. 1, 2A, 2B, 3, 4, 5A, 6, 7A and 7B are shown in FIGS. 10-12. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 10-12, many other methods of implementing the example system controller 222 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The method 1000 of FIG. 10 is an example method for implementing the drag modification system 102 of FIGS. 1, 2A, 2B, 3, 4, and 5A. The method 1000 begins with the system controller 222 receiving flight phase data (block 1002). For example, the flight phase determiner 902 receives flight phase data from the main controller 912. Based on the flight phase data received, the system controller 222 determines whether to activate the drag modification system 102 (block 1004). For example, the system controller 222 activates the drag modification system 102 during certain phases of flight. For instance, the boundary layer system activator 904 activates the drag modification system 102 when the flight phase determiner 902 determines that the aircraft is in a cruise phase of flight and deactivates the drag modification system 102 when the flight phase determiner 902 determines that the aircraft is in a taxiing, a descent, a landing, a take-off, or a climb phase of flight.

If the system controller 222 at block 1004 determines that the drag modification system 102 should not be activated, the system controller 222 causes a motive fluid valve (e.g., the first control valve 432) to move to a closed position (block 1006). For example, to deactivate the drag modification system 102, the boundary layer system activator 904 instructs, commands and/or otherwise causes the valve operator 908 to move the first control valve 432 to a closed position.

If the system controller 222 at block 1004 determines that the drag modification system 102 should be activated to reduce drag, the system controller 222 causes the motive fluid valve (e.g., the first control valve 432) to move to an open position (block 1008). For example, to activate the drag modification system 102, the boundary layer system activator 904 instructs, commands and/or otherwise causes the valve operator 908 to move the first control valve 432 to an open position.

The system controller 222 determines if the drag modification system 102 should persist (block 1010). For example, the system controller 222 can continue to persist the drag modification system 102 until the system controller 222 determines that the aircraft 100 is taxiing, parked or idle via the flight phase determiner 902. If the system controller 222 determines at block 1010 that drag modification of the boundary layer is to continue (e.g., the drag modification system 102 should persist), control returns to block 1002. If the system controller 222 determines at block 1010 that the drag modification of the boundary layer should not continue, the method 1000 ends.

The method 1100 of FIG. 11 is an example method for implementing the drag modification system 600 of FIG. 6. The method 1100 begins with the system controller 222 receiving flight phase data (block 1102). For example, the flight phase determiner 902 receives flight phase data from the main controller 912. Based on the flight phase data received, the system controller 222 determines whether to activate the drag modification system 600 (block 1104). For example, the system controller 222 activates the drag modification system 600 during certain phases of flight. For instance, the boundary layer system activator 904 activates the drag modification system 102 during a cruise phase of flight and deactivates the drag modification system 600 during taxiing, descent, landing, take-off, and climb phases of flight.

If the system controller 222 at block 1104 determines that the drag modification system 600 should be activated, the system controller 222 causes a motive fluid valve (e.g., the first control valve 432) to move to an open position (block 1106). For example, to activate the drag modification system 600, the boundary layer system activator 904 instructs, commands and/or otherwise causes the valve operator 908 to move the first control valve 432 to a first or open position to allow the first motive fluid 604 to flow to the nozzle inlet 416.

The system controller 222 then receives first motive fluid parameter(s) (block 1108). For example, the system controller 222 and/or the motive fluid determiner 906 receives outputs or signals representative of one or more fluid parameter(s) of the first motive fluid from the first sensor 434.

The motive fluid determiner 906 determines if the fluid parameter(s) of the first motive fluid 604 exceed a threshold (block 1110). For example, the system controller 222 and/or the motive fluid determiner 906 determines whether a pressure, a velocity, a mass flow rate, and/or any other parameter(s) are sufficient to enable the first motive fluid 604 to generate a suction at the suction inlet 420. For example, the system controller 222 and/or motive fluid determiner 906 can compare the one or more fluid parameter(s) to one or more corresponding threshold values retrieved from a look-up table from a memory of the system controller 222 and/or the main controller 912.

If the system controller 222 at block 1110 determines that the first motive fluid parameter(s) exceeds the threshold, the system controller 222 causes a supplemental motive fluid valve (e.g., the second control valve 614) to move to a closed position (block 1112). For example, the valve operator 908 causes the second control valve 614 to move to a closed position. In the closed position, the second control valve 614 prevents the second motive fluid 608 from flowing to the nozzle inlet 416.

If the system controller 222 at block 1110 determines that the first motive fluid parameter(s) does not exceed the threshold, the system controller 222 causes the supplemental motive fluid valve (e.g., the second control valve 614) to move to an open position (block 1114). For example, the valve operator 908 causes the second control valve 614 to move to an open position. In the open position, the second control valve 614 allows the second motive fluid 608 to flow to the nozzle inlet 416.

The system controller 222 then receives second motive fluid parameter(s) (block 1116). For example, the system controller 222 and/or the motive fluid determiner 906 receives outputs or signals representative of one or more fluid parameter(s) of the second motive fluid 608 from the second sensor 616.

The motive fluid determiner 906 determines if the fluid parameter(s) of the second motive fluid 608 exceeds a threshold (block 1118). For example, the system controller 222 and/or the motive fluid determiner 906 determine whether a pressure, a velocity, a mass flow rate, and/or any other parameter(s) of the second motive fluid 608 is sufficient to enable the second motive fluid 608 (e.g., without use of the first motive fluid 604) to generate a suction at the suction inlet 420. For example, the system controller 222 and/or motive fluid determiner 906 can compare the one or more fluid parameter(s) to one or more corresponding threshold values retrieved from a look-up table from a memory of the system controller 222 and/or the main controller 912.

If the system controller 222 at block 1118 determines that the second motive fluid parameter(s) exceeds the threshold, the system controller 222 causes the first motive fluid valve (e.g., the first control valve 432) to move to a closed position (block 1120). For example, the valve operator 908 causes the first control valve 432 to move to an open position. In the closed position, the first control valve 432 prevents the first motive fluid 604 from flowing to the nozzle inlet 416. In such an example, the second motive fluid 608 generates suction at the suction inlet 420 without using the first motive fluid 604.

If the system controller 222 at block 1118 determines that the second motive fluid parameter(s) does not exceed the threshold, the system controller 222 causes the first motive fluid valve (e.g., the first control valve 432) to move to an open position (block 1122). In the open position, the first control valve 432 allows the first motive fluid 604 to flow to the nozzle inlet 416. In this example, the first motive fluid 604 and the second motive fluid 608 work together and/or mix together through the nozzle 408 to generate suction at the suction inlet 420.

If the system controller 222 at block 1104 determines that the drag modification system 102 should not be activated, the system controller 222 causes a first motive fluid valve (e.g., the first control valve 432) to move to a closed position (block 1124) and the second motive fluid valve (e.g., the second control valve 614) to move to a closed position (block 1126). For example, to deactivate the drag modification system 600, the boundary layer system activator 904 instructs, commands and/or otherwise causes the valve operator 908 to move the first control valve 432 to a closed position and the second control valve 614 to a closed position to prevent flow of the first motive fluid 604 and the second motive fluid 608 to the nozzle inlet 416.

The system controller 222 determines if the drag modification system 102 should persist (block 1128). For example, the system controller 222 can continue to persist the drag modification system 600 until the system controller 222 determines that the aircraft 100 is taxiing, parked or idle via the flight phase determiner 902. If the system controller 222 determines at block 1128 that drag modification of the boundary layer is to continue (e.g., the drag modification system 600 should persist), control returns to block 1102. If the system controller 222 determines that the drag modification of the boundary layer should not continue (block 1128), the method 1100 ends.

The method 1200 of FIG. 12 is an example method for implementing the drag modification system 700 of FIGS. 7A and 7B. The method 1200 begins with the system controller 222 receiving flight phase data (block 1202). For example, the flight phase determiner 902 receives flight phase data from the main controller 912. Based on the flight phase data received, the system controller 222 determines whether to activate the drag modification system 700 (block 1204). For example, the system controller 222 activates the drag modification system 700 during certain phases of flight. For instance, the boundary layer system activator 904 activates the drag modification system 700 during cruise, descent and/or landing phases of flight and deactivates the drag modification system 700 during taxiing, take-off, and climb phases of flight. For example, as noted above, the drag modification system 700 provides dual functionality for reducing drag and increasing drag.

If the system controller 222 determines at block 1204 to activate the drag modification system 700, the system controller 222 determines if drag should be decreased (block 1206). For example, the boundary layer system activator 904 determines to decrease drag when the flight phase determiner 902 determines that the aircraft 100 is in a cruise phase of flight. Thus, the system controller 222 activates the first mode of operation 702 (FIG. 7A) of the drag modification system 700 to decrease and/or reduce drag.

If the system controller 222 at block 1206 determines to decrease drag, the system controller 222 causes the first motive fluid valve (e.g., the first control valve 432) to move to an open position (block 1208) and the causes the exit valve (e.g., the third control valve 706) to move to an open position (block 1210). For example, to activate the first mode of operation 702 of the drag modification system 700 and decrease drag, the valve operator 908 instructs, commands and/or otherwise causes the first control valve 432 to move to an open position to allow the first motive fluid 604 to flow to the nozzle inlet 416 and the third control valve 706 to move to the open position to allow the mixed fluid 436 to exhaust via the outlet 212 and create a suction at the suction inlet 420.

Furthermore, the system controller 222 determines if the drag modification system 700 includes an active supplemental motive fluid system (e.g., the supplemental motive fluid system 601) (block 1212). For example, the motive fluid determiner 906 detects whether a supplemental motive fluid system 601 and/or a secondary motive fluid valve (e.g., the second control valve 614) is active, available for control, and/or otherwise communicatively coupled to the system controller 222. If the system controller 222 determines at block 1212 that the supplemental motive fluid system 601 is not active, the process moves to block 123

If the system controller 222 determines at block 1212 that the supplemental motive fluid system 601 is active, the system controller 222 receives the motive fluid parameters from the first sensor 434 (block 1214). For example, the system controller 222 receives output signals from the first sensor 434 to determine and/or detect a pressure, a velocity and/or other parameter of the first motive fluid 604.

The system controller 2222 then determines whether to add supplemental motive fluid (e.g., the second motive fluid 608) based on the received first motive fluid parameters (block 1216). If the system controller 222 determines at block 1216 that a supplemental motive fluid is not needed, the system controller 222 commands, instructs and/or otherwise causes the secondary motive fluid valve (e.g., the second control valve 614) to move to a closed position to prevent the second motive fluid 608 from flowing to the nozzle inlet 416 (block 1218), and the program returns to block 1236. If the system controller 222 determines at block 1216 that a supplemental motive fluid is needed, the system controller 222 commands, instructs and/or otherwise causes the secondary motive fluid valve (e.g., the second control valve 614) to move to an open position to enable the supplemental motive fluid (e.g., the second motive fluid 608) to flow to the nozzle inlet 416 (block 1220), and the program returns to block 1236. Alternatively, if the drag modification system 700 does not include the supplemental motive fluid system 601, then blocks 1212-1220 can be omitted from the method 1200 or ignored by the system controller 222. The method 1200 would then return to block 1236 from block 1210 and/or 1212.

Referring back to block 1206, if the system controller 222 determines at block 1206 that drag should not be decreased, the system controller 222 determines whether drag should be increased or induced (block 1222). For example, the boundary layer system activator 904 determines to increase drag when the flight phase determiner 902 detects that the aircraft 100 is in a descent phase of flight and/or a landing phase of flight. Thus, the system controller 222 activates the second mode of operation 704 (FIG. 7B) of the drag modification system 700 to increase drag.

If the system controller 222 at block 1206 determines to increase drag, the system controller 222 causes the first motive fluid valve (e.g., the first motive fluid 604) to move to an open position (block 1224) and the causes the exit valve (e.g., the third control valve 706) to move to a closed position (block 1226). For example, to activate the second mode of operation 704 of the drag modification system 700 and decrease drag as shown in FIG. 7B, the valve operator 908 instructs, commands and/or otherwise causes the first control valve 432 to move to an open position to allow the first motive fluid 604 to flow to the nozzle inlet 416 and the third control valve 706 to move to the closed position to prevent the mixed fluid 436 from discharging from the outlet 212 and instead causing the first motive fluid 604 to discharge from the second inlet 210.

Furthermore, the system controller 222 returns to block 1212 to determine if the drag modification system 700 includes an active supplemental motive fluid system (e.g., the supplemental motive fluid system 601) (block 1212). If the system controller 222 determines at block 1212 that the supplemental motive fluid system is active, the system controller 222 receives the motive fluid parameters from the first sensor 434 (block 1214). For example, the system controller 222 receives output signals from the first sensor 434 to determine and/or detect a pressure, a velocity and/or other parameter of the first motive fluid 604. The system controller 222 then determines whether to add supplemental motive fluid (e.g., the second motive fluid 608) based on the received first motive fluid parameters (block 1216). If the system controller 222 determines that a supplemental motive fluid is not needed, the system controller 222 commands, instructs and/or otherwise causes the secondary motive fluid valve (e.g., the second control valve 614) to move to a closed position to prevent supplemental motive fluid from flowing to the nozzle inlet 416 (block 1218), and the program returns to block 1236. If the system controller 222 determines that a supplemental motive fluid is needed, the system controller 222 commands, instructs and/or otherwise causes the secondary motive fluid valve (e.g., the second control valve 614) to move to an open position to enable the supplemental motive fluid (e.g., the second motive fluid 608) to flow to the nozzle inlet 416 (block 1220), and the program returns to block 1236.

Referring to block 1204, if the system controller 222 at block 1204 determines that the drag modification system 700 should not be activated, the system controller 222 deactivates the drag modification system 700. To deactivate the drag modification system 700, the system controller 222 instructs, commands and/or otherwise causes the first motive fluid valve to move to a closed position (block 1228). In this example, the system controller 222 also causes the exit valve (e.g., the third control valve 706) to move to an open position (block 1230). In some examples, at block 1230, the system controller 222 can alternatively command the exit valve to move to a closed position. Additionally, if the drag modification system 700 includes the supplemental motive fluid system, the system controller 222 causes the secondary motive fluid valve (e.g., the second control valve 614) to move to a closed position (block 1234). If the drag modification system 700 does not include the supplemental motive fluid system, then block 1232 or block 1234 can be omitted or ignored by the system controller 222 and the method proceeds to block 1236.

The system controller 222 determines if the drag modification system 700 should persist (block 1236). For example, the system controller 222 can continue to persist the drag modification system 700 until the system controller 222 determines that the aircraft 100 is taxiing, parked or idle via the flight phase determiner 902. If the system controller 222 determines at block 1236 that drag modification of the boundary layer is to continue (e.g., the drag modification system 700 should persist), control returns to block 1202. If the system controller 222 determines that the drag modification of the boundary layer should not continue (block 1236), the method 1200 ends.

Figure 13:
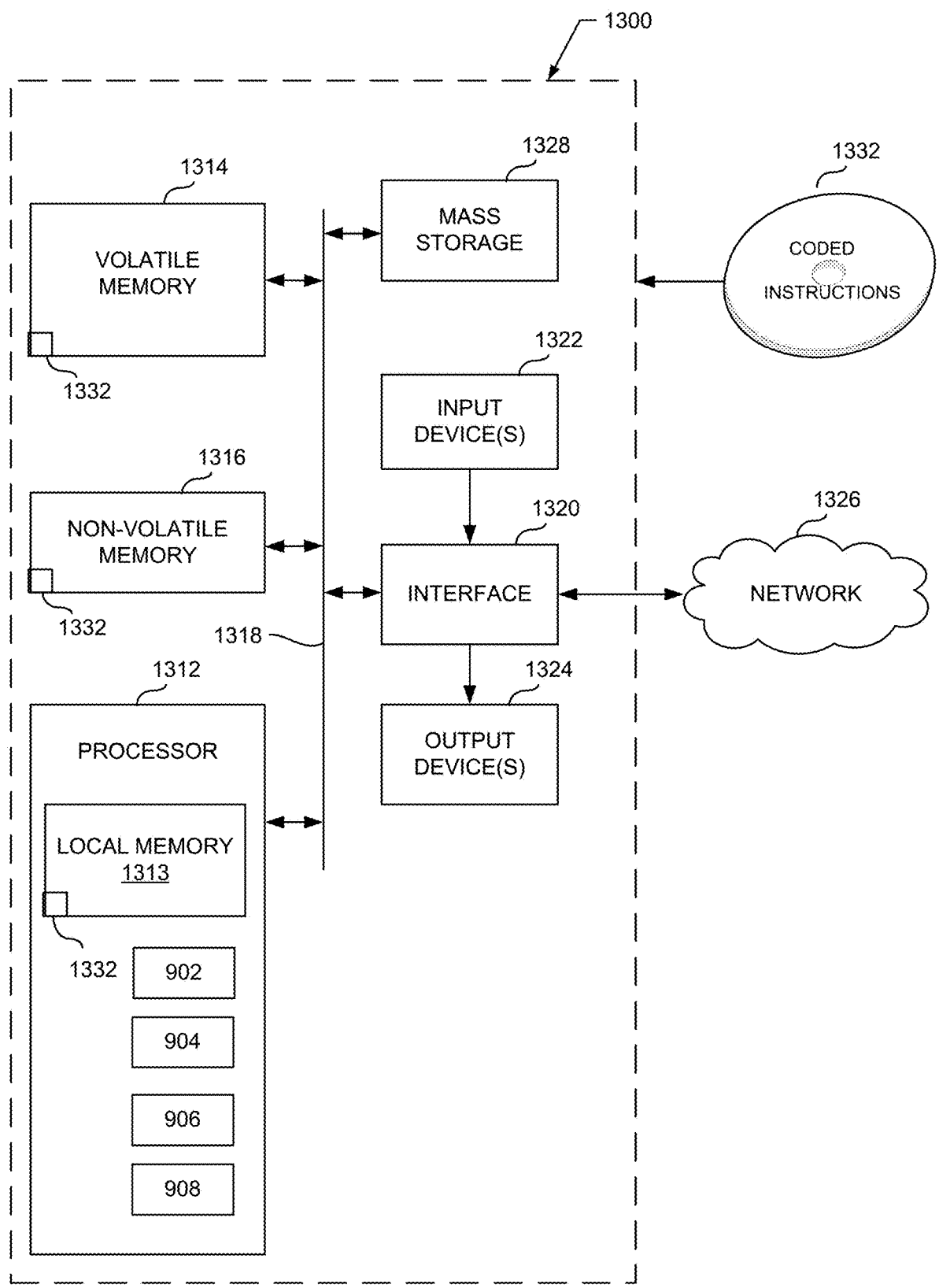
FIG. 13 is a block diagram of an example processor platform capable of executing the instructions of FIGS. 10-12 to implement an example controller of FIG. 9.

FIG. 13 is a block diagram of an example processor platform 1300 structured to execute the instructions of FIGS. 10-12 to implement the system controller 222 of FIG. 9. The processor platform 1300 can be, for example, a server, a personal computer, a workstation, a self-learning machine (e.g., a neural network), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the flight phase determiner 902, the boundary layer system activator 904, the motive fluid determiner 906, and the valve operator 908.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a keyboard, a button, a touchscreen, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 10-12 may be stored in the mass storage device 1328, in the volatile memory 1314, in the non-volatile memory 1316, and/or on a removable non-transitory computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

The following paragraphs provide various examples of the examples disclosed herein.

Example 1 includes a system for modifying drag on an aircraft including a boundary layer intake plenum and an eductor. The eductor having a primary inlet to receive a primary fluid, a secondary inlet in fluid communication with the intake plenum to receive a secondary fluid entrained from the intake plenum, and an outlet to exhaust a mixed flow including the primary fluid and the secondary fluid. The primary fluid is a motive fluid having flow parameters to generate a suction at the secondary inlet.

Example 2 includes the system of Example 1, wherein the boundary layer intake plenum is to be flush mounted relative to exterior surface of a fuselage of an aircraft.

Example 3 includes the system of any of Examples 1-2, wherein the intake plenum is to be positioned downstream from a wing of the aircraft and upstream from an empennage of the aircraft.

Example 4 includes the system of any of Examples 1-3, wherein the intake plenum includes a plurality of openings to allow intake of the boundary layer to the secondary inlet during flight.

Example 5 includes the system of any of Examples 1-4, wherein the outlet is to fluidly couple with a wake of the aircraft.

Example 6 includes the system of any of Examples 1-5, wherein the primary inlet is to receive pressurized air.

Example 7 includes the system of any of Examples 1-6, wherein the primary inlet is to receive pressurized air from an aircraft cabin.

Example 8 includes the system of any of Examples 1-7, further including a fluid control valve to control cabin air flow into the primary inlet.

Example 9 includes the system of any of Examples 1-8, further including a third inlet to receive a tertiary fluid, where the primary fluid is entrained from the primary inlet via a second eductor, wherein the tertiary fluid is pressurized air from the trim air system.

Example 10 includes the system of any of Examples 1-9, further including further comprising an outlet valve in fluid communication with the outlet, wherein when the exit value is moved to a closed, the primary fluid is exhausted through the secondary inlet to increase drag.

Example 11 includes the system of any of Examples 1-10, wherein the primary fluid is to have a pressure that is greater than a pressure of the secondary fluid.

Example 12 includes the system of any of Examples 1-11, wherein the tertiary fluid is to have a pressure that is greater than a pressure of the primary fluid.

Example 13 includes a system to modify drag of an aircraft including a manifold defining a passageway to extend between an exterior of a fuselage of the aircraft to an exhaust of the aircraft. The passageway includes a first inlet in fluid communication with a motive fluid, a second inlet in fluid communication with the exterior of the fuselage, and an outlet in fluid communication with the exhaust. The motive fluid to generate a suction to cause airflow to draw through the second inlet and channel the airflow to the exhaust to reduce drag.

Example 14 includes the system of Example 13, wherein the manifold includes a plenum in fluid communication with the first inlet.

Example 15 includes the system of any of Examples 13-14, wherein the plenum includes a screen having perforations to allow boundary layer airflow within the plenum.

Example 16 includes the system of any of Examples 13-15, wherein the screen has a contour that is complementary to a contour of an exterior of the fuselage.

Example 17 includes the system of any of Examples 13-16, wherein the screen is flush mounted relative to an exterior surface of the fuselage.

Example 18 includes the system of any of Examples 13-17, further comprising a third inlet, where the third inlet is in fluid communication with a second motive fluid that is higher energy than the first motive fluid.

Example 19 includes the system of any of Examples 13-18, further comprising an exit valve in fluid communication with the outlet, where when the exit value is closed, instead of the motive fluid generate a suction to cause airflow to draw through the second inlet and channel the airflow to the exhaust, the primary fluid is exhausted through the second inlet; whereby instead of the drag being reduced, the drag is increased.

Example 20 includes a method to reduce drag of an aircraft including providing a high energy airflow into an eductor; entraining air from an intake plenum into the high energy airflow via the eductor; receiving a boundary layer airflow into the intake plenum as a result of a negative pressure gradient effectuated by entrainment of air from the intake plenum into the eductor; and discharging the high energy airflow and the boundary layer airflow from the eductor.

Example 21 includes the method of Example 20, wherein the discharging of the high energy airflow and the boundary layer airflow includes discharging the high energy airflow and the boundary layer airflow from the eductor into a wake of the aircraft to reduce drag during flight.

Example 22 includes the system of any of Examples 20-21, wherein the providing of the high energy airflow includes controlling an overboard valve to cause cabin air to flow into the eductor.

Example 23 includes a method to increase drag of an aircraft including providing a high energy airflow into an eductor; blocking an exit of the eductor such that the high energy airflow flows into an intake plenum; and discharging the high energy airflow into a boundary layer from the intake plenum as a result of a positive pressure gradient from the intake plenum into ambient air external of the aircraft.

Example 24 includes the method of Example 23, wherein the providing of the high energy airflow.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to modify drag on an aircraft, the system comprising:
   a boundary layer intake plenum mounted to an exterior surface of a fuselage of the aircraft;
   an eductor defining:
      a primary inlet to receive a primary fluid pressurized air from a cabin of the aircraft;
      a secondary inlet in fluid communication with the intake plenum configured to receive a secondary fluid entrained from the intake plenum and generate a suction at the secondary inlet to ingest boundary layer air and modify a boundary layer of the aircraft by reducing the boundary layer such that the portion of the boundary layer ingested does not build up or locally spill into the wake of the aircraft to reduce drag during flight, the pressurized air from the cabin of the aircraft to provide the eductor a propulsive force; and
      an outlet to exhaust a mixed flow including the primary fluid and the secondary fluid.

2. The system of claim 1, wherein the intake plenum is to be positioned downstream from a wing of the aircraft and upstream from an empennage of the aircraft.

3. The system of claim 1, wherein the intake plenum includes a plurality of openings to allow intake of the boundary layer to the secondary inlet during flight.

4. The system of claim 1, wherein the outlet is to fluidly couple with a wake of the aircraft.

5. The system of claim 1, further including a fluid control valve to control cabin air flow into the primary inlet.

6. The system of claim 1, further comprising a third inlet to receive a tertiary fluid, wherein the tertiary fluid is pressurized air from a cabin trim air system.

7. The system of claim 6, wherein the primary fluid is to have a pressure that is greater than a pressure of the secondary fluid.

8. The system of claim 7, wherein the tertiary fluid is to have a pressure that is greater than the pressure of the primary fluid.

9. The system of claim 1, further including an outlet valve in fluid communication with the outlet, wherein the primary fluid exhausts through the secondary inlet to increase drag when the outlet valve is in a closed position.

10. A system to modify drag of an aircraft, the system including:
a manifold defining a passageway to extend between an exterior of a fuselage of the aircraft and an exhaust of the aircraft, the passageway including:
a first inlet in fluid communication with a first motive fluid, the first motive fluid including pressurized air from a cabin of the aircraft;
a second inlet in fluid communication with the exterior of the fuselage, the second inlet flush mounted relative to the exterior of the fuselage at least a portion of the second inlet has a curvature complementary to a curvature of the exterior of the fuselage, the manifold configured to receive the first motive fluid and generate a suction at the second inlet to ingest a boundary layer airflow to reduce the boundary layer such that the portion of the boundary layer ingested does not build up or locally spill into the wake of the aircraft to increase at least one of a velocity or acceleration of the boundary layer airflow during flight to reduce drag; and
an outlet in fluid communication with the exhaust.

11. The system of claim 10, wherein the manifold includes a plenum in fluid communication with the second inlet.

12. The system of claim 11, wherein the plenum includes a plurality of openings to allow boundary layer airflow within the plenum.

13. The system of claim 12, wherein the plurality of openings has a contour that is complementary to a contour of the exterior of the fuselage.

14. The system of claim 10, further including a third inlet, where the third inlet is in fluid communication with a second motive fluid having a higher energy than the first motive fluid.

15. The system of claim 10, further including an outlet valve in fluid communication with the outlet, wherein when the outlet valve is closed, the first motive fluid is exhausted through the second inlet to increase drag instead of reducing drag.

16. The system of claim 1, wherein the intake plenum includes an intake frame, the intake frame having a rectangular shape and a curvature complementary to the exterior surface of the fuselage.

17. The system of claim 1, wherein the intake plenum defines an opening have a rectangular shape.

18. The system of claim 3, wherein the plurality of openings is a perforated plate.

19. The system of claim 1, wherein the boundary layer intake plenum is flush mounted relative to the exterior surface of the fuselage.

20. The system of claim 1, wherein the eductor is structured to accelerate the boundary layer to a velocity that equals or exceeds a free stream velocity of the boundary layer during flight.

21. The system of claim 1, wherein the suction to be generated by the eductor modifies a velocity of the boundary layer that equals or exceeds a free stream velocity of the boundary layer.

* * * * *